(12) United States Patent
Liu et al.

(10) Patent No.: US 12,488,526 B2
(45) Date of Patent: Dec. 2, 2025

(54) METHODS AND SYSTEMS FOR PROVIDING AN INTERACTIVE PLATFORM TO FACILITATE INTERACTION BETWEEN CONTENT CREATORS AND VIEWERS

(71) Applicant: HYTTO PTE. LTD., Singapore (SG)

(72) Inventors: Dan Liu, Singapore (SG); Jilin Qiu, Singapore (SG)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 19/004,493

(22) Filed: Dec. 30, 2024

(65) Prior Publication Data

US 2025/0148685 A1    May 8, 2025

Related U.S. Application Data

(60) Continuation-in-part of application No. 18/737,043, filed on Jun. 7, 2024, and a continuation-in-part of
(Continued)

(51) Int. Cl.
*A61H 19/00* (2006.01)
*G06F 3/04817* (2022.01)
(Continued)

(52) U.S. Cl.
CPC .......... *G06T 13/80* (2013.01); *G06F 3/04817* (2013.01); *G06F 3/0482* (2013.01);
(Continued)

(58) Field of Classification Search
None
See application file for complete search history.

(56) References Cited

U.S. PATENT DOCUMENTS 11,701,292 B1 *   7/2023   Liu ................ H04L 65/61
                                                    705/39
11,922,553 B1     3/2024   Liu et al.
(Continued)

FOREIGN PATENT DOCUMENTS

CN    112333460 A    2/2021
WO    2020200082 A1  10/2020

OTHER PUBLICATIONS

U.S. Appl. No. 18/494,128, filed Oct. 25, 2023.

*Primary Examiner* — Thaddeus B Cox
(74) *Attorney, Agent, or Firm* — Holtz, Holtz & Volek PC

(57) ABSTRACT

The present disclosure relates to methods and systems for providing an interactive platform to facilitate interaction between content creators and viewers. The method performed by a system includes obtaining media content performed by a content creator on an interactive platform through a first user device of the content creator. The method includes detecting a set of target objects in the media content of the content creator. The method includes generating an interaction element in response to detecting the set of target objects related to online adult entertainment in the media content of the content creator. The method includes executing an interaction mode for the interaction element. The interaction mode of the interaction element includes a first interaction mode and a second interaction mode. The interaction element facilitates interaction between the content creator and a plurality of viewers of the media content.

20 Claims, 14 Drawing Sheets

Related U.S. Application Data application No. 18/541,028, filed on Dec. 15, 2023, now Pat. No. 12,223,578, and a continuation-in-part of application No. 18/494,128, filed on Oct. 25, 2023, said application No. 18/737,043 is a continuation-in-part of application No. 18/371,716, filed on Sep. 22, 2023, now Pat. No. 12,251,350, and a continuation-in-part of application No. 18/140,262, filed on Apr. 27, 2023, now Pat. No. 12,035,000, said application No. 18/541,028 is a division of application No. 18/296,823, filed on Apr. 6, 2023, said application No. 18/371,716 is a continuation of application No. 17/930,805, filed on Sep. 9, 2022, now Pat. No. 11,800,191.

(51) Int. Cl.
*G06F 3/0482* (2013.01)
*G06F 3/0488* (2022.01)
*G06T 13/40* (2011.01)
*G06T 13/80* (2011.01)

(52) U.S. Cl.
CPC ............ *G06F 3/0488* (2013.01); *G06T 13/40* (2013.01); *A61H 19/00* (2013.01); *G06T 2200/24* (2013.01)

(56) References Cited

U.S. PATENT DOCUMENTS

| | | |
|---|---|---|
| 12,035,000 B1 | 7/2024 | Liu et al. |
| 2024/0089539 A1 | 3/2024 | Liu et al. |
| 2024/0315918 A1 | 9/2024 | Liu et al. |
| 2024/0338875 A1 | 10/2024 | Liu et al. |

* cited by examiner

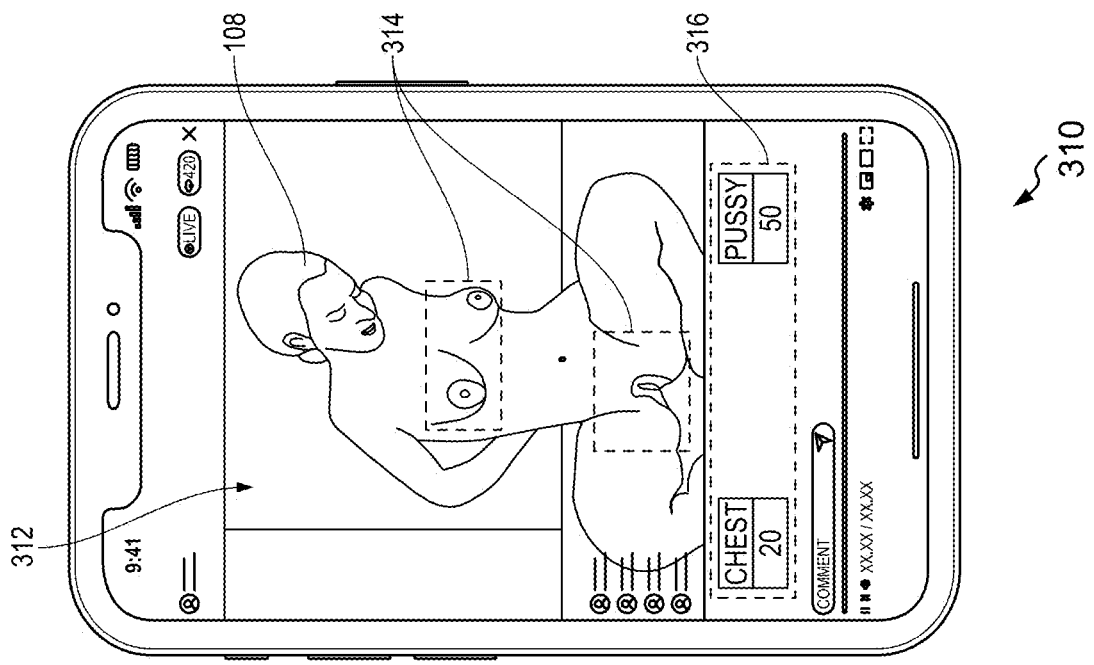
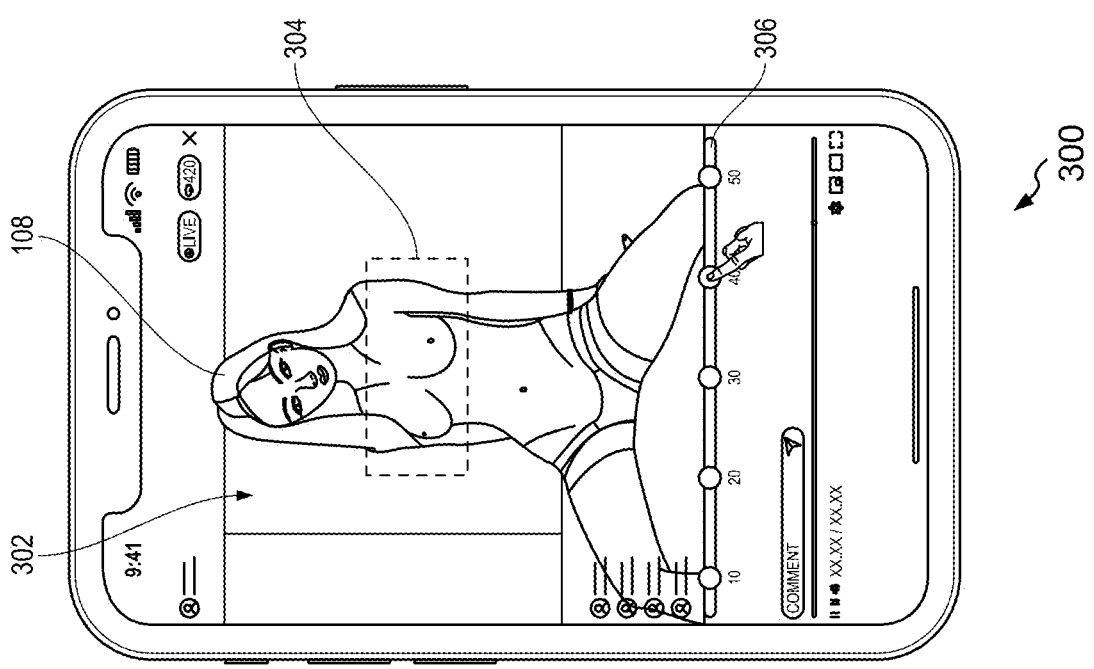
FIG. 3B
FIG. 3A

METHODS AND SYSTEMS FOR PROVIDING AN INTERACTIVE PLATFORM TO FACILITATE INTERACTION BETWEEN CONTENT CREATORS AND VIEWERS

CROSS REFERENCE TO RELATED APPLICATIONS

This application is a Continuation-in-Part of U.S. patent application Ser. No. 18/541,028, filed Dec. 15, 2023, now U.S. Pat. No. 12,223,578, issued Feb. 11, 2025, which is a Divisional of U.S. patent application Ser. No. 18/296,823, filed on Apr. 6, 2023, now U.S. Pat. No. 11,922,553, issued Mar. 5, 2024. This application is also a Continuation-in-Part of U.S. application Ser. No. 18/494,128, filed Oct. 25, 2023. This application is also a Continuation-in-Part of U.S. application Ser. No. 18/737,043, filed Jun. 7, 2024, which is a Continuation-in-Part of U.S. patent application Ser. No. 18/140,262, filed Apr. 27, 2023, now U.S. Pat. No. 12,035,000, issued Jul. 9, 2024. Application Ser. No. 18/737,043 is also a continuation-in-part of U.S. patent application Ser. No. 18/371,716, filed Sep. 22, 2023, now U.S. U.S. Pat. No. 12,251,350, issued Mar. 18, 2025, which is a Continuation of U.S. patent application Ser. No. 17/930,805, filed Sep. 9, 2022, now U.S. Pat. No. 11,800,191 issued Oct. 24, 2023. Each of the above applications is hereby incorporated by reference in its entirety.

TECHNICAL FIELD

The present disclosure relates to electronic-based adult entertainment systems and methods, and more particularly relates to systems and methods for providing an interactive platform to facilitate sexually related interaction between content creators and viewers.

BACKGROUND

In general, the interaction between content creators and viewers on an online platform typically revolves around real-time communication, content sharing, and personalized engagement. This dynamic interaction can occur in a variety of formats, such as live streams, virtual reality environments, social media, or gaming platforms. In the context of adult entertainment, the interaction between the content creators and the viewers is centered around real-time communication, intimacy, and adult content. These interactions are typically driven by a combination of entertainment, personal connection, and viewer-driven engagement. In particular, the content creators perform not only sexual acts but also provide emotional engagement, companionship, and fantasy fulfillment. In this scenario, the viewers may directly influence the content and the interaction through the use of predefined interaction features of the online platform.

The predefined interaction features on the online platform, while designed to enhance viewer engagement and interactions, often come with a host of challenges that impact both the content creators and the viewers. The predefined interaction features may limit the flexibility of the content creator's performance and may reduce the spontaneity and creativity that could make the interaction more enjoyable for both the content creators and the viewers. In other words, the predefined interaction features may offer limited flexibility in the online platform which often prevents the viewers from engaging with the content creators in a personalized way. Further, the predefined interaction features in the online platform might result in the viewer's retainment in a performance of the content creator hosted on the online platform. The inability to actively influence or participate in the performance makes the experience feel passive and less appealing over time. Furthermore, actions defined for the predefined interaction features may disrupt the natural flow of the interaction between the content creators and the viewers. While the online platform often offers the predefined interaction features, they may not provide sufficient tools for the content creator's to moderate their broadcast room. In addition, the predefined interaction features designed without regard to content type may result in inappropriate or mismatched interactions between the content creators and the viewers in the online platform. Moreover, generic interaction features defined in the online platform may set up expectations for certain types of performances that don't match the actual content being offered in the online platform.

Therefore, there is a need for systems and methods for providing an interactive adult entertainment platform with content-specific interaction features that overcome the aforementioned deficiencies along with providing other advantages.

SUMMARY

Various embodiments of the present disclosure disclose methods and systems for providing an interactive platform to facilitate interaction between content creators and viewers.

In an embodiment, a computer-implemented method is disclosed. The computer-implemented method performed by a system includes obtaining media content being performed by a content creator on an interactive platform through a first user device associated with the content creator, wherein the media content is configured for transmission to at least one second user device of at least one viewer communicatively connected to the first user device for presentation. Further, the method includes detecting a set of target objects in the media content of the content creator. The set of target objects detected in the media content corresponds to online adult entertainment. The method further includes generating at least one interaction element in response to detecting the set of target objects related to the online adult entertainment in the media content of the content creator. The method further includes executing an interaction mode for the at least one interaction element corresponding to the target object, wherein the interaction mode of the at least one interaction element includes one or both of a first interaction mode and a second interaction mode, wherein the first interaction mode is configured to provide an interface for interactive input corresponding to the set of target objects between the at least one second user device and the first user device, and the second interaction mode is configured to provide guidance on interactive input corresponding to the set of target objects between the at least one second user device and the first user device.

In another embodiment, a system is disclosed. The system includes a communication interface, a memory configured to store instructions, and a processor communicably coupled to the communication interface and the memory. The processor is configured to execute the instructions stored in the memory and thereby cause the system to obtain media content being performed by a content creator on an interactive platform through a first user device associated with the content creator, wherein the media content is configured for transmission to at least one second user device of at least one viewer communicatively connected to the first user device for presentation. Further, the system is configured to detect a set of target objects in the media content of the content creator. The set of target objects detected in the media content corresponds to online adult entertainment. The system is further configured to generate at least one interaction element in response to detecting the set of target objects related to the online adult entertainment in the media content of the content creator. The system further executes an interaction mode for the at least one interaction element corresponding to the target object, wherein the interaction mode of the at least one interaction element includes one or both of a first interaction mode and a second interaction mode, wherein the first interaction mode is configured to provide an interface for interactive input corresponding to the set of target objects between the at least one second user device and the first user device, and the second interaction mode is configured to provide guidance on interactive input corresponding to the set of target objects between the at least one second user device and the first user device.

In another embodiment, a non-transitory computer-readable storage medium is disclosed. The non-transitory computer-readable storage medium includes machine-readable instructions. Further, the machine-readable instructions when executed by a processor of a system enable the system to perform a method including steps of obtaining media content being performed by a content creator on an interactive platform through a first user device associated with the content creator, wherein the media content is configured for transmission to at least one second user device of at least one viewer communicatively connected to the first user device for presentation. The method includes detecting a set of target objects in the media content of the content creator. The set of target objects detected in the media content corresponds to online adult entertainment. The method further includes generating at least one interaction element in response to detecting the set of target objects related to the online adult entertainment in the media content of the content creator and executing an interaction mode for the at least one interaction element corresponding to the target object, wherein the interaction mode of the at least one interaction element includes one or both of a first interaction mode and a second interaction mode, wherein the first interaction mode is configured to provide an interface for interactive input corresponding to the set of target objects between the at least one second user device and the first user device, and the second interaction mode is configured to provide guidance on interactive input corresponding to the set of target objects between the at least one second user device and the first user device.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers:

FIG. 3A illustrates an exemplary representation of a user interface (UI) depicting interaction between a viewer and a content creator using at least one interaction element configured with a first interaction mode, in accordance with an embodiment of the present disclosure;

FIG. 3B illustrates an exemplary representation of a user interface (UI) depicting interaction between the viewer and the content creator using at least one interaction element configured with the first interaction mode, in accordance with another embodiment of the present disclosure;

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

Various embodiments of the present disclosure are described hereinafter with reference to FIG. 1 to FIG. 9.

Figure 1:
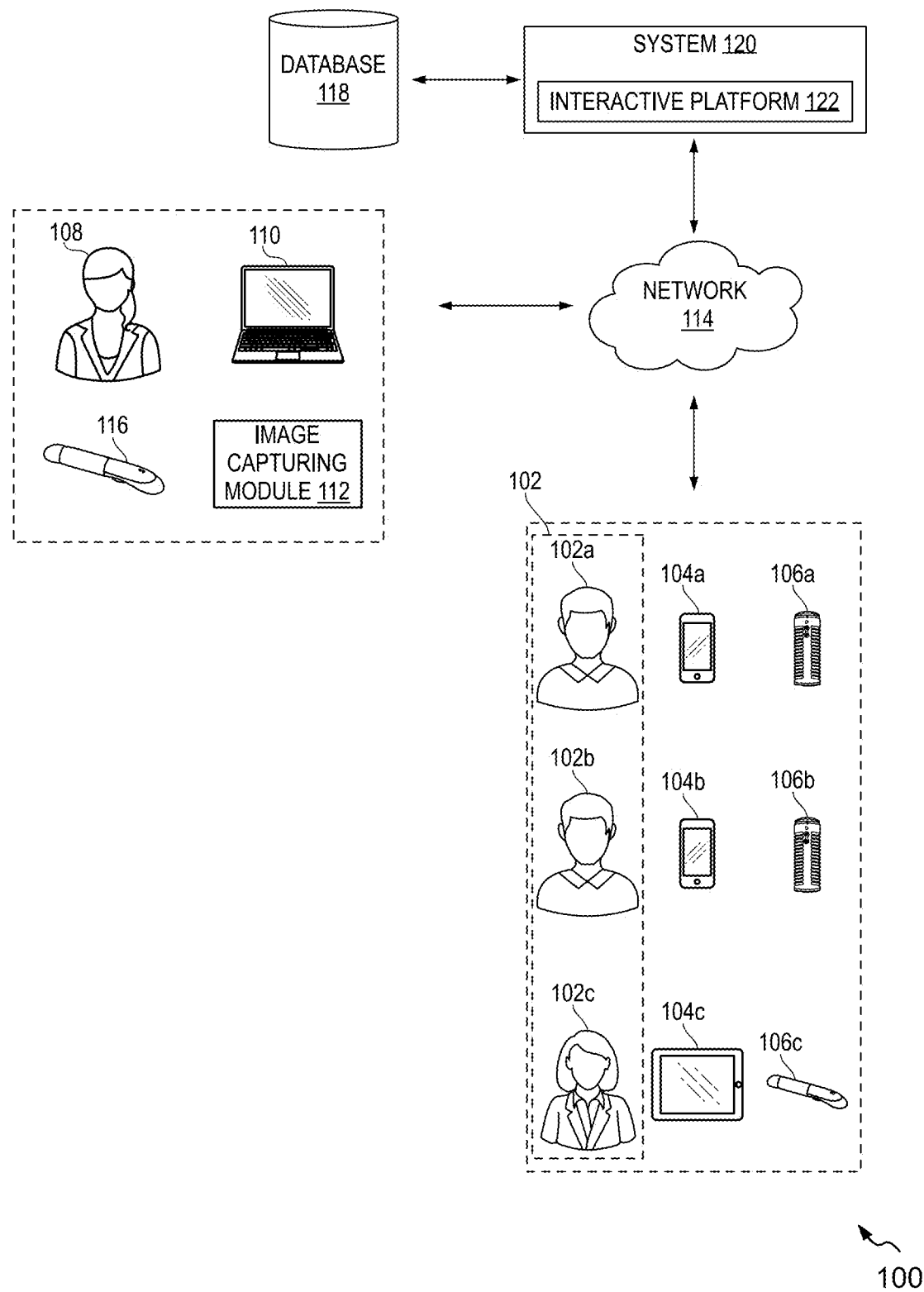
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a plurality of viewers such as a viewer 102a, a viewer 102b, and a viewer 102c. For description purposes, only three viewers are shown, however, there can be any number of viewers. The viewers 102a-102c are collectively referred to as the plurality of viewers 102 or the viewers 102. Each of the viewers 102a-102c is associated with a second user device 104a, a second user device 104b, and a second user device 104c, respectively. The second user devices 104a-104c may include at least a laptop computer, a phablet computer, a handheld personal computer, a virtual reality (VR) device, a netbook, a Web book, a tablet computing device, a smartphone, or other mobile computing devices.

Further, the environment 100 includes a content creator 108. In an embodiment, the content creator 108 may be a user who performs content (e.g., online adult entertainment content, pornographic live broadcast, or online adult entertainment content broadcasting). For illustration purposes, only a single content creator is depicted in FIG. 1, however, there can be any number of content creators. The content creator 108 is associated with a first user device 110 (exemplarily depicted to be a laptop computer). In an embodiment, the content creator 108 may use the first user device 110 for capturing the content (such as pornographic live performances) of the content creator 108. In another embodiment, the content creator 108 may utilize an image capturing module 112 connected (wired/wirelessly connected) to the first user device 110 to capture the content being performed by the content creator 108.

Furthermore, the viewers 102a, 102b, and 102c are associated with a sexual stimulation device 106a, a sexual stimulation device 106b, and a sexual stimulation device 106c, respectively. The content creator 108 is associated with a sexual stimulation device 116. For example, the sexual stimulation device 116 may be an adult toy. The sexual stimulation devices 106a-106c and the sexual stimulation device 116 may be selected based on the gender of the plurality of viewers 102 and the content creator 108. For example, the sexual stimulation devices 106a and 106b may be male sex toys, and the sexual stimulation device 106c, and the sexual stimulation device 116 may be female sex toys. Some examples of female sex toys may include, but are not limited to, a dildo, a vibrator, and the like. Some examples of male sex toys may include masturbators. The sexual stimulation devices 106a-106c may be connected wirelessly with the respective second user devices 104a-104c. Further, the sexual stimulation device 116 may be connected wirelessly to the first user device 110. Some examples of the wireless connectivity may be, but are not limited to, Near-Field communication (NFC), wireless fidelity (Wi-Fi), Bluetooth, and the like.

Various entities in the environment 100 may connect to a network 114 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 114 may include a secure protocol (e.g., Hypertext Transfer Protocol (HTTP)), and/or any other protocol, or set of protocols. In an example embodiment, the network 114 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

The environment 100 further includes a system 120. The system 120 may be embodied in at least one computing device in communication with the network 114. In an embodiment, the system 120 may be embodied in the second user devices 104a-104c. The system 120 may be specifically configured, via executable instructions to perform one or more of the operations described herein. In general, the system 120 is configured to provide adult entertainment which will be explained further in detail. Further, the system 120 is configured to provide an interactive platform 122 to facilitate interaction between the plurality of viewers 102 and the content creator 108 and provide an interactive online adult entertainment experience. The interactive platform 122 may be hosted and managed by the system 120. Further, one or more components of the interactive platform 122 may be stored in a database 118 associated with the system 120. In an embodiment, the interactive platform 122 may be hosted by a third-party application server (not shown in figures) and communicably coupled to the network 114. The interactive platform 122 is a set of computer-executable codes configured to allow the content creator 108 to create media content (e.g., a live broadcast or pornographic live streaming performances) for the plurality of viewers 102. In one embodiment, the interactive platform 122 may be accessed as a web-based application on the second user devices 104a-

104c and the first user device 110. In another embodiment, the second user devices 104a-104c and the first user device 110 may access an instance of the interactive platform 122 from the system 120 for installing on the second user devices 104a-104c and the first user device 110 using application stores associated with operating systems such as Apple IOS®, Android™ OS, Google Chrome OS, Symbian OS®, Windows Mobile® OS, and the like.

As explained above, the content creator 108 accesses the interactive platform 122 to create the media content (e.g., pornographic live performance). The plurality of viewers 102 may access the interactive platform 122 on their respective second user devices 104a-104c to view the media content of the content creator 108. The system 120 facilitates the interaction between the plurality of viewers 102 and the content creator 108 on the interactive platform 122 based on the media content of the content creator 108 rendered on the interactive platform 122, interaction inputs provided by the plurality of viewers 102, and so on.

In particular, the system 120 is configured to obtain/access the media content being performed by the content creator 108 on the interactive platform 122 through the first user device 110 associated with the content creator 108. The media content of the content creator 108 may be transmitted to/accessed by the system 120 in real-time or near real-time considering the latency and transmission loss experienced in wireless communication protocols or the network 114. Thereafter, the system 120 is configured to detect a set of target objects in the media content of the content creator 108 based at least on implementing one or more machine learning (ML) models. The set of target objects detected in the media content corresponds to online adult entertainment. The set of target objects may include, but not limited to, body parts, body morphology, gestures, a sexual stimulation device (such as the sexual stimulation device 116), and scene information of the media content. The body parts may include, but not limited to, breasts, buttocks, vaginal area, or any sexual organs. Further, the scene information of the media content refers to the detailed data and context related to individual scenes within a piece of media. The scene information may encompass a variety of elements (such as audio-visual elements, time information, aspect ratio, genre, and so on) that define the content, tone, and structure of the scene.

Further, the system 120 generates at least one interaction element in response to detecting the set of target objects related to the online adult entertainment in the media content of the content creator 108. The system 120 configures an interaction mode for the at least one interaction element. The interaction mode of the at least one interaction element may include one or both of a first interaction mode and a second interaction mode. The at least one interaction element facilitates interaction between the content creator 108 and the plurality of viewers 102 of the media content being rendered on the interactive platform 122 in one of the first interaction mode and the second interaction mode defined for the at least one interaction element, wherein the first interaction mode is configured to provide an interface for interactive input corresponding to the set of target objects between the at least one second user device and the first user device, and the second interaction mode is configured to provide guidance on interactive input corresponding to the set of target objects between the at least one second user device and the first user device. In the first interaction mode, an interface is provided for the viewers (associated with the at least one second user device) to interact with the content creator (associated with the first user device). This interface can be in the form of a control interface on the user interface, such as a button, slider, or other graphical elements that allow the viewers to input commands or actions corresponding to the set of target objects. For example, if the target object is a particular body part of the content creator, the control interface may include options to send tokens, request a specific action related to that body part, or adjust parameters of a sexual stimulation device associated with the content creator. Alternatively, the interface for interactive input can also be a voice interface. The viewers can use voice commands to interact with the content creator. For instance, they can verbally request a certain performance or action related to the target objects. The system is configured to recognize and process these voice commands and translate them into corresponding actions or instructions between the second user device and the first user device. This enables a more natural and convenient interaction for the viewers, especially in situations where using a graphical control interface might be inconvenient or time-consuming. As an example, the second interaction mode focuses on guiding the interactive input related to the set of target objects. It offers various forms of guidance between the at least one second user device of the viewer and the first user device of the content creator. For example, it may present text prompts on the viewer's device, like suggesting specific actions or token amounts to trigger a desired response from the content creator associated with the target objects. Visual cues such as highlighting or animated indicators around the target objects can also be provided to direct the viewer's attention and guide them to relevant interaction controls. Additionally, audio guidance might be employed, informing the viewer about available voice commands and their corresponding functions for interacting with the target objects. This mode essentially streamlines the interaction process by providing clear instructions and cues, enabling the viewer to engage more effectively with the content creator in relation to the specific target objects in the online adult entertainment context.

The at least one interaction element configured with the first interaction mode corresponds to directly driven interaction elements. The directly driven interaction elements may allow the plurality of viewers 102 and the content creator 108 to directly interact with each other on the interactive platform 122. In other words, the directly driven interaction elements allow the plurality of viewers 102 to directly interact with the content creator 108 performing the media content on the interactive platform 122. Some examples of the directly driven interactive elements may include an interface interaction control being rendered on an interaction interface of the interactive platform 122.

The at least one interaction element configured with the second interaction mode corresponds to indirectly driven interaction elements. The indirectly driven elements do not directly provide the interaction but rather guide the plurality of viewers 102 or the content creator 108 to take action by stimulating an emotional response, interest in the plurality of viewers 102, and so on. Some examples of the indirectly driven interaction elements may include a voice prompt, a text prompt, image data, and a visual effect configured to guide at least the content creator 108 and the plurality of viewers 102 to provide an interaction input.

Further, the plurality of viewers 102 and the content creator 108 may interact in the interactive platform 122 by providing an interaction input on the at least one interaction element configured with one of the first interaction mode and the second interaction mode. The interaction input may be related to the set of target objects. In particular, the interaction inputs are defined based on the nature and characteristics of the set of target objects. The interaction input may be in various forms such as on the interaction control interface, selecting a screen area corresponding to the set of target objects, sending a message, and so on.

The number and arrangement of systems, devices, and/or networks shown in FIG. 1 are provided as an example. There may be other systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices.

Figure 2:
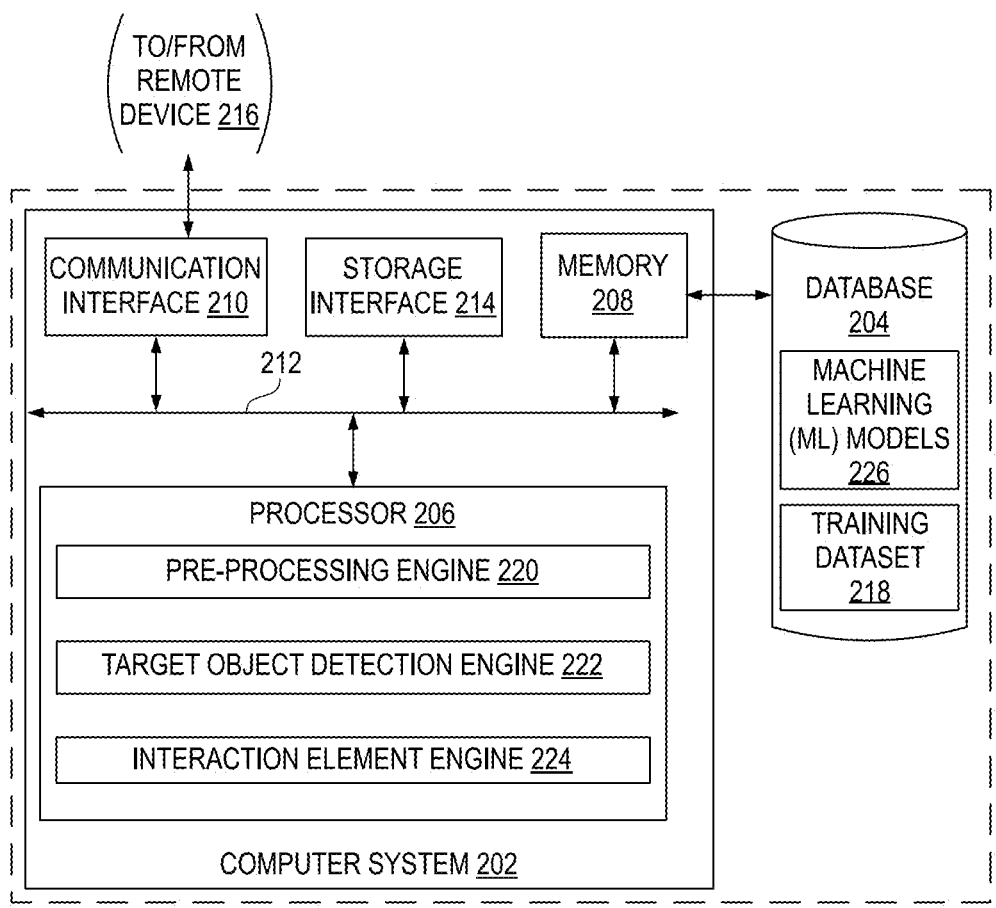
FIG. 2 illustrates a simplified block diagram of an application server for providing an interactive online adult entertainment platform, in accordance with an embodiment of the present disclosure.

FIG. 2 illustrates a simplified block diagram of a system 200 for providing an interactive online adult entertainment platform, in accordance with an embodiment of the present disclosure. Examples of the system 200 may include, but are not limited to, the system 120 as shown in FIG. 1. The system 200 includes a computer system 202 and a database 204. The computer system 202 includes at least one processor 206 for executing instructions, a memory 208, a communication interface 210, and a storage interface 214. The one or more components of the computer system 202 communicate with each other via a bus 212.

In one embodiment, the database 204 is integrated within the computer system 202 and configured to store an instance of the interactive platform 122 and one or more components of the interactive platform 122. In addition, the database 204 is configured to store media content, control parameters for operating sexual stimulation devices, interaction elements, and the like. The computer system 202 may include one or more hard disk drives as the database 204. The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the system 200, as described herein. In some embodiments, the memory 208 may be realized in the form of a database or cloud storage working in conjunction with the system 200, without deviating from the scope of the present disclosure.

The processor 206 is operatively coupled to the communication interface 210 such that the processor 206 is capable of communicating with a remote device 216 such as the second user devices 104a-104c, the first user device 110, the sexual stimulation devices 106a-106c, the sexual stimulation device 116, or with any entity connected to the network 114 as shown in FIG. 1.

It is noted that the system 200 as illustrated and hereinafter described is merely illustrative of an apparatus that could benefit from embodiments of the present disclosure and, therefore, should not be taken to limit the scope of the present disclosure. It is noted that the system 200 may include fewer or more components than those depicted in FIG. 2.

In one embodiment, the processor 206 includes a pre-processing engine 220, a target object detection engine 222, and an interaction element engine 224. The processor 206 may include other engines apart from those depicted in FIG. 2, therefore, it should not be taken to limit the scope of the present disclosure.

The pre-processing engine 220 includes suitable logic and/or interfaces to apply one or more pre-processing techniques to the media content received from the first user device 110 of the content creator 108. In particular, the media content may be captured using the terminal 110 or the image capturing module 112. Further, the media content may be encoded i.e., converted into a specific format using a codec (coder-decoder) for efficient storage, transmission, or playback. Some non-limiting examples of the specific formats for encoding the media data may include Audio Video Interleave (AVI), Moving Picture Experts Group-4 Part 14 (MP4), Matroska Video (MKV), Joint Photographic Experts Group (JPEG/JPG), Portable Network Graphics, (PNG), and the like). The encoded media data is transmitted to the pre-processing engine 220 via the network 114.

The pre-processing engine 220 applies the pre-processing techniques to the encoded media data. The pre-processing techniques may include, but not limited to, denoising, quality enhancement, resizing, frame normalization, and the like. The pre-processing engine 220 applies the denoising technique to the media content to remove noise interference that may be caused by the shooting environment, equipment, and other factors. The pre-processing engine 220 may use filtering algorithms (such as median filter, Gaussian filter, etc.) as the denoising technique to reduce random noise points in the media content. Further, the pre-processing engine 220 may perform enhancement of the received media content to improve the quality of the media content. Specifically, the pre-processing engine 220 may adjust one or more parameters such as brightness, contrast, and saturation of the media content. This increases the identification probability of the set of target objects in the media content which will be explained further in detail. Furthermore, the pre-processing engine 220 may adjust the media content to a suitable size according to the requirements of the target object detection engine 222. Resizing the media content may improve the efficiency and accuracy of recognition and avoid the recognition effect being affected by too large or too small size of the media content. The pre-processing engine 220 may further perform normalizing the pixel values across frames of the media content to handle variations in lighting or quality of the image capturing module 112 or the first user device 110 over time. Equalizing lighting conditions in the frames of the media content ensures consistent colour balance in the media content. It should be understood that the pre-processing engine 220 may apply other pre-processing techniques to improve the quality of the media content for better recognition of the set of target objects in the media content. Therefore, the pre-processing techniques mentioned herein should not be taken to limit the scope of the present disclosure.

The target object detection engine 222 may include suitable logic and/or interfaces to detect the set of target objects in the media content upon applying the one or more pre-processing techniques to the media content obtained from the first user device 110. The target object detection engine 222 may implement one or more machine learning (ML) models 226 to detect the set of target objects in the media content. The one or more ML models 226 is trained with a training dataset 218 for detecting the set of target objects in the media content.

In particular, the processor 206 may obtain datasets including historical media data. The historical media data may include various explicit objects (such as the target objects) or actions relevant to the task (e.g., online adult entertainment). The historical media data may be performed by the content creator 108 on the interactive platform 122 or any other content creator of the interactive platform 122. Further, the pre-processing engine 220 may apply the one or more pre-processing techniques to the historical media data. Thereafter, the processor 206 may extract a plurality of features corresponding to the set of target objects to be identified in the media content of the content creator 108 based at least on applying at least one feature extraction technique. The plurality of features may include, but not limited to, body parts, body morphology, gestures, and sexual stimulation devices. In general, the extraction of the plurality of features from the media data involves identifying and extracting key attributes or characteristics from the media data that are relevant for specific tasks such as classification, analysis, or machine learning. Further, the at least one feature extraction technique may be based on colour features, shape features, texture features, deep learning features, and the like. The description related to the at least one feature extraction technique is as follows:

A) Based on the colour features: colour histograms, colour moments and other methods are used to extract the colour features of the target object in the media content. For example, the specific clothing colour of a model may be associated with a sensitive part, and the colour features may be used to initially locate the sensitive part.

B) Based on the shape features: Use edge detection, contour extraction and other methods to extract the shape features of the target object. For example, the contour shape of the model's body is determined by detecting the edges in the image, or the shape features of the target object are described by specific shape descriptors (e.g., Hu moments, Fourier descriptors, etc.).

C) Based on the texture features: texture analysis methods, such as grey scale covariance matrix, local binary mode, Gabor filters etc., which capture repetitive patterns, orientations, and frequencies may be used to extract the texture features of the target object. For example, the skin texture of the model or the surface texture of a specific sex toy may be used as a basis for recognition.

D) Based on the deep learning features: feature extraction using deep neural networks (e.g., convolutional neural network (CNN), You Only Look Once (YOLO), etc.). Further, the ML models 226 implementing the neural networks are configured to automatically learn the feature representation of the target object based on the training dataset 218. The feature extraction using the deep learning based feature technique results in the extraction of more abstract and advanced features with stronger recognition capabilities.

Further, the processor 206 is configured to generate the training dataset 218 for training the one or more machine learning (ML) models 218 to detect the set of target objects in the media content of the content creator 108. The training dataset 218 may include the historical media data and the plurality of features for detecting the set of target objects in the media content of the content creator 108. The training dataset 218 may be an example of a labelled training dataset. The training dataset 218 (i.e., the labelled training dataset) may include target objects and corresponding labels that are used to indicate the presence of a particular target object in the media content of the content creator 108. Further, generating the labelled training dataset (i.e., the training dataset 218) may include identifying the object categories of the target objects that are relevant for detection in the online adult entertainment in the media content. Some examples of the object categories may include, but not limited to, body parts (such as face, hands, torsos, etc.), morphology, clothing (such as lingerie, accessories, or specific types of attire, environmental elements (such as beds, sofas, specific locations associated with sexual activity), explicit objects (such as sex toys, props, and other items typical in adult content), behavioural aspects (such as kissing, hugging, or explicit actions), and scene context. Further, the processor 206 may use annotation tools to annotate or label the objects extracted from the historical media data and generate the training dataset 218 for training the ML models 226. For example, the steps for labelling the target objects are listed below:

Object labels may be defined as "Nudity," "Clothing," "Toy," and "Bed."

Further, the target objects may be segmented from the media content corresponding to the object labels nudity or specific objects like toys or furniture.

Additionally, the action labels (such as "Intercourse," "Kissing," and "Hugging") may be defined based on the scene information in which the target objects are present.

In an embodiment, the ML models 226 may include classifier models that are trained with the training dataset 218. Some examples of the classifier models may include, but not limited to, K-Nearest Neighbors (KNN), Support Vector Machines (SVM), Neural Networks, Random Forest, and the like. The classifier models (or the ML models 226) may initialize model parameters (i.e., weights). Further, the classifier models are provided with test input (e.g., media data) for detecting the output (such as the labels) for the objects in the media data. The output of the classifier models is backpropagated to adjust the parameters to reduce the error in detecting the target objects in the media content upon deployment. For example, algorithms such as Stochastic Gradient Descent (SGD) or Adam may be used to update the model parameters to minimize the loss.

Once the ML models 226 is trained with the training dataset 218, the ML models 226 are deployed in the real-world application for detecting the set of target objects in the media content of the content creator 108. In particular, the target element detection engine 222 with access to the training dataset 218 is configured to detect presence of one or more target objects in the media content of the content creator 108 upon applying the one or more pre-processing techniques to the media content. The target element detection engine 222 may apply object detection techniques such as sliding window and region proposal network (RPN), and deep learning networks to detect the presence of the one or more target objects in the media content of the content creator 108. Further, the target object detection engine 222 may compute a confidence score for each target object of the one or more target objects identified in the media content of the content creator 108 based at least on the one or more machine learning (ML) models 226. Thereafter, the target object detection engine 222 determines whether the confidence score of the one or more target objects exceeds a threshold confidence score. The target object detection engine 222 determines the one or more target objects as the set of target objects in the media content if the confidence score associated with the one or more target objects exceeds the threshold confidence score.

In addition, the target object detection engine 222 is configured to detect the set of target objects based on an identification weight associated with each target object of the set of target objects. The identification weight of the target object typically refers to the significance or contribution of certain features or characteristics of the target object that are recognized by the ML models 226. Thereafter, the target object detection engine 222 is configured to analyze the identification weight associated with each target object. The target object detection engine 222 selects a target object from the set of target objects based on determining the identification weight associated with the target object of the set of target objects being greater than the identification weight of other target objects of the set of target objects. In one example scenario, the set of target objects identified in the media content of the content creator 108 may include a target object A (such as pussy) and a target object B (such as breast). In this scenario, the target object detection engine 222 retrieves the identification weight associated with the target objects A and B from the database 204. The identification weight of the target objects A and B may be 10 and 8.5, respectively. For description purposes, the identification weight is represented as a numerical value. Further, the identification weight may be represented in any other formats, therefore it should not be taken to limit the scope of the present disclosure. The target object detection engine 222 detects the target object A as the set of target objects as the identification weight of the target object A is greater than the identification weight of the other target object (i.e., the target object B). For example, the identification weight of the Pussy is higher than the identification weight of the chest, and the identification weight of the chest is higher than the identification weight of the buttocks. Hence, in the media content, if both the Pussy and chest appear, the Pussy is recognized as the set of target objects.

The interaction element engine 224 includes suitable logic and/or interfaces to determine the at least one interaction element in response to detecting the set of target objects related to the online adult entertainment in the media content of the content creator 108. Further, the interaction element engine 224 determines the interaction mode for the at least one interaction element. The interaction mode of the at least one interaction element may include the first interaction mode and the second interaction mode. The at least one interaction element facilitates interaction between the content creator 108 and the plurality of viewers 102 of the media content being rendered on the interactive platform 122 in one of the first interaction mode and the second interaction mode defined for the at least one interaction element.

In an embodiment, the interaction element engine 224 determines whether a sexual stimulation device (such as the sexual stimulation device 116) associated with the content creator 108 is communicably coupled to the interactive platform 122 equipped on the first user device 110 of the content creator 108. The sexual stimulation device 116 is wirelessly connected to the first user device 110 which enables the interactive platform 122 to control the sexual stimulation device 116. In particular, the target object detection engine 222 detects the set of target objects related to the online adult entertainment in the media content of the content creator 108. Thereafter, the target object detection engine 222 triggers the interaction element engine 224 to detect whether the sexual stimulation device 116 of the content creator 108 is communicably coupled to the interactive platform 122 (or the first user device 110 equipped with the interactive platform 122). In response to determining the sexual stimulation device 116 is communicably coupled to the interactive platform 122, the interactive element engine 224 determines a visual effect corresponding to the sexual stimulation device 116 and an operating mode of the sexual stimulation device 116. Further, the interaction element engine 224 renders the visual effect in the media content of the content creator 108. The visual effect is configured to perform a set of actions on the set of target objects. The set of actions is defined based on the operating mode of the sexual stimulation device 116.

In one embodiment, the interaction element engine 224 monitors tokens being rendered by a viewer (such as the viewer 102a) among the plurality of viewers 102 to the content creator 108. For example, the tokens may include monetary value or the tokens may be virtual currency or virtual gift. In addition, the interaction element engine 224 monitors a selection input of the viewer 102a on the visual effect rendered in the media content on the interactive platform 122. For example, the visual effect may be a virtual representation of an adult toy such as the sexual stimulation device 116 and the operating mode of the adult toy may be vibration mode. In this scenario, the interaction element engine 224 monitors if the viewer 102a provides tokens in the media content while the adult toy (i.e., the visual effect) is rendered on the media content of the content creator 108. In this scenario, the viewer 102a may click (i.e., the selection input) on the adult toy rendered in the media content. In response to detecting the selection input on the adult toy and the tokens provided by the viewer 102a, the interaction element engine 224 generates a control instruction based on the selection input on the visual effect and the tokens rendered by the viewer 102a to the content creator 108 in the interactive platform 122. The control instruction may be predefined and stored in the database 204. The interaction element engine 224 retrieves the control instruction corresponding to the adult toy being rendered in the media content. Further, the interaction element engine 224 transmits the control instruction to the first user device 110 of the content creator 108. In one embodiment, the control instruction is configured to operate at least the sexual stimulation device 116 of the content creator 108. The control instruction may be transmitted to the second user device 104a of the viewer 102a, thus enabling the viewer 102a to control sexual stimulation device 106a based on the control instruction. In another embodiment, the control instruction may allow the viewer 102a to request the content creator 108 to perform a sexual activity (such as performing a nude show).

The interaction element engine 224 is further configured to monitor an interaction input provided by at least one viewer (e.g., the viewer 102a) of the plurality of viewers 102. In particular, the interaction element engine 224 detects positional coordinates of a target object of the set of target objects identified in the media content of the content creator 108. Further, the interaction element engine 224 detects an interaction position parameter of the interaction input provided by the at least one viewer (e.g., the viewer 102a) of the plurality of viewers 102. The interaction position parameter may be detected based on the interaction input provided on an interaction interface (or a display interface) of the second user device 104a of the at least one viewer 102a while viewing the media content of the content creator 108 on the interactive platform 122 equipped in the second user device 104a. The at least one viewer 102a provides the interaction input on the target object to facilitate interaction between the at least one viewer 102a and the content creator 108. For example, a target object such as the chest of the content creator 108 is identified in the media content of the content creator 108. The positional coordinates of the target object (i.e., the chest) of the content creator 108 may be represented using 2-Dimensional (2D) cartesian coordinates. The positional coordinates of the chest of the content creator 108 rendered in the media content being viewed on the second user device 104a by the viewer 102a may be (2, 3). Further, the viewer 102a may provide the interaction input such as clicking on the display interface (or the interaction interface) of the second user device 104a corresponding to the positional coordinates of the chest of the content creator 108 being rendered on the second user device 104a. In one scenario, the viewer 102a clicks on the interaction interface at (2, 3) point where the chest of the content creator 108 is being rendered on the second user device 104a. Herein, the viewer 102a clicking on the interaction interface of the second user device 104a at the point (2, 3) corresponds to the interaction position parameter of the interaction input provided on the interaction interface of the second user device 104a.

Further, the interaction element engine 224 detects whether the interaction position parameter of the interaction input of the viewer 102a matches the positional coordinates of the target object rendered in the media content of the content creator 108. If the interaction position parameter of the interaction input matches with the positional coordinates of the target object, the interaction element engine 224 generates an operation instruction corresponding to the at least one interaction element determined for the target object. The operation instruction is configured to facilitate the interaction between the at least one viewer 102a and the content creator 108 corresponding to the interaction input. The operation instruction may include one of operating a token rendering tool, generating a control instruction to control the sexual stimulation device 116 of the content creator 108, and a set of interaction options.

Furthermore, the interaction element engine 224 determines an operation result corresponding to the execution of the operation instruction in the media content of the content creator 108. The interaction element engine 224 determines at least one of a segment in the media content corresponding to the operation result obtained based on the execution of the operation instruction in the media content, and an object type of the set of target objects. Thereafter, the interaction element engine 224 renders a plurality of visual elements in the segment of the media content determined corresponding to the operation result. For example, a viewer (such as the viewer 102b) may execute the operation instruction such as operating the token rendering tool to render the tokens in the media content. In this scenario, the interaction element engine 224 records the operation result i.e., the tokens rendered using the token rendering tool. The interaction element engine 224 may determine the segment in the media content of the content creator 108 during which the viewer 102b provides the tokens using the token rendering tool. The segment of the media content may include, for example, the masturbation action being performed by the content creator 108. Thus, the interaction element engine 224 determines the plurality of visual elements that match the masturbation action of the content creator 108 being performed in the identified segment of the media content. The plurality of visual elements is then rendered in the segment of the media content being performed by the content creator 108. In this example scenario, the interaction element engine 224 may render text such as 'ENJOY THE MASTURBATION ACTION' as the plurality of visual elements to match the context/actions of the identified segment in the media content.

In addition, the system 200 is configured to monitor motion parameters associated with the set of target objects (for example, the gestures) identified in the media content of the content creator 108. For example, the gestures being performed by the content creator 108 are waving hands. In this scenario, the system 200 monitors the motion trajectory of the content creator 108 to determine the motion parameters of the gestures. Further, the system 200 determines the plurality of visual elements based on the gestures and the motion parameters of the gestures. The system 200 may implement the ML models 226 to recognize the gestures being performed by the content creator 108 in the media content. The ML models 226 may implement artificial intelligence (AI) detection techniques to recognize the gestures being performed by the content creator 108 in the media content. In addition, the ML models 226 may implement a set of gesture parsing logic to convert the gestures being performed by the content creator 108 in the media content to generate the at least one interaction element and/or the plurality of visual elements. Furthermore, the ML models 226 may implement image processing techniques such as edge detection, contour extraction, and feature point tracking to identify the positional coordinates and detect the motion parameters of the set of target objects (e.g., the gestures). For example, the Lucas-Kanade optical flow method can be used to track the motion parameters of a finger of the content creator 108 in the media content.

In one embodiment, the system 120 obtains the interaction input information generated between at least one second user device 104a-104c (associated with the viewer) and the first user device 110 (associated with the content creator). Such interaction input can be the information generated by various operations that the viewer conducts on the second user device 104a-104c when watching the media content presented by the content creator on the interactive platform through the first user device 110. For example, operations like clicking specific interaction buttons, sliding the control bars on the screen, sending specific commands or text messages, and making voice inputs. The data generated by these operations will all be acquired by System 120. Then, based on the acquired interaction input, System 120 generates a corresponding operation instruction. This operation instruction has a specific function, that is, it can control the second user device 104a-104c or the first user device 110 to perform sexual entertainment actions corresponding to the interaction input. For illustration purposes, suppose the content creator displays an adult toy in the media content. When the viewer clicks an "Turn on Vibration" interaction button (interaction input) on the second user device 104a-104c, the operation instruction generated by System 120 will control the first user device 110 associated with the content creator and then control the adult toy to turn on the vibration function. This is a kind of sexual entertainment action. Or when the viewer slides the control bar on the screen to adjust the intensity and frequency of the vibration, System 120 generates corresponding instructions according to these interaction operations to precisely control the operating parameters of the sexual stimulation device, so as to meet the interaction needs between the viewer and the content creator and enhance the sexual entertainment experience. For example, when the viewer clicks on the virtual gift icon on the screen, after receiving this input, System 120 generates an operation instruction to trigger the content creator's device (i.e., the first user device 110) to play specific animation effects or sound effects, or control the sex toy to perform specific actions (such as rotating or heating). Another example is that when the viewer requests the content creator to perform specific actions through voice commands, like "Please dance" or "Please show a specific part", after receiving this voice input, System 120 generates an operation instruction to prompt the content creator to perform the actions requested by the viewer. Moreover, when the viewer participates in an interactive game, for example, by clicking on the target objects on the screen to increase the content creator's points, after receiving this input, System 120 generates an operation instruction to control the content creator's device (the first user device 110) to display the animation effect of the points increasing, or trigger the sex toy to perform corresponding feedback actions. Also, when the viewer selects a "Romantic Atmosphere" option (interaction input) on the second user device 104a-104c, the operation instruction generated by System 120 will make the first user device 110 control to display some romantic visual effects in the media content of the content creator, such as soft light flickering, heart special effects, etc., or play some soft music, sexy sounds and other audio effects (sexual entertainment actions), thus creating a specific sexual entertainment atmosphere and enhancing the viewer's sense of experience and participation.

FIG. 3A illustrates an exemplary representation of a user interface (UI) 300 depicting interaction between a viewer such as the viewer 102a and the content creator 108 using at least one interaction element configured with a first interaction mode, in accordance with an embodiment of the present disclosure. As shown, the UI 300 is depicted to include media content 302 being performed by the content creator 108 in the interactive platform 122. The media content 302 may be accessed by a viewer (for example, the viewer 102a) using the second user device 104a. In this scenario, the system 200 identifies a set of target objects 304. For example, the chest of the content creator 108 is identified as the set of target objects 304. In this scenario, the system 200 may generate at least one interaction element 306 and define the interaction mode to be the first interaction mode. The at least one interaction element 306 configured with the first interaction mode may be an interface interaction control. For example, the token rendering tool is depicted as the at least one interaction element 306. The identification of the set of target objects 304 is exemplarily depicted using a dashed boundary. In this scenario, the viewer 102a may provide the interaction input on the at least one interaction element 306 configured with the first interaction mode. For illustration purposes, the interaction input being provided by the viewer 102a is depicted using a portion of the hand of the viewer 102a. The interaction input may include sliding on the token rendering tool to provide tokens to the content creator 108 in the interactive platform 122. The extent of the sliding action on the token rendering tool will define the quantity of the tokens to be rendered to the content creator 108. In this way, the viewer 102a directly interacts with the at least one interaction element 306 of the media content 302 in the interactive platform 122.

FIG. 3B illustrates an exemplary representation of a user interface (UI) 310 depicting interaction between a viewer such as the viewer 102a and the content creator 108 using the at least one interaction element configured with the first interaction mode, in accordance with another embodiment of the present disclosure. The system 200 may render the at least one interaction element (see, 316 of FIG. 3B) configured with the first interaction mode corresponding to identifying a set of target objects 314 (e.g., chest and pussy of the content creator 108) in media content 312. As shown, the at least one interaction element 316 is exemplarily rendered as predefined tokens defined for the set of target objects 314 in the interactive platform 122. In an embodiment, the predefined tokens may be defined by the content creator 108. In another embodiment, the predefined tokens may be defined by the system 200 managing the interactive platform 122. For example, the predefined tokens for the chest and pussy (i.e., the set of target objects 314) of the content creator 108 are depicted as 20 and 50, respectively. The viewer 102a may provide the interaction input (click/tap) on the predefined tokens to provide the tokens to the content creator 108 in the media content 312. In one example scenario, if the viewer 102a selects the predefined tokens of 20, the viewer 102a is rendered with a live show of shaking the tits of the content creator 108 in the media content 312.

Figure 3C:
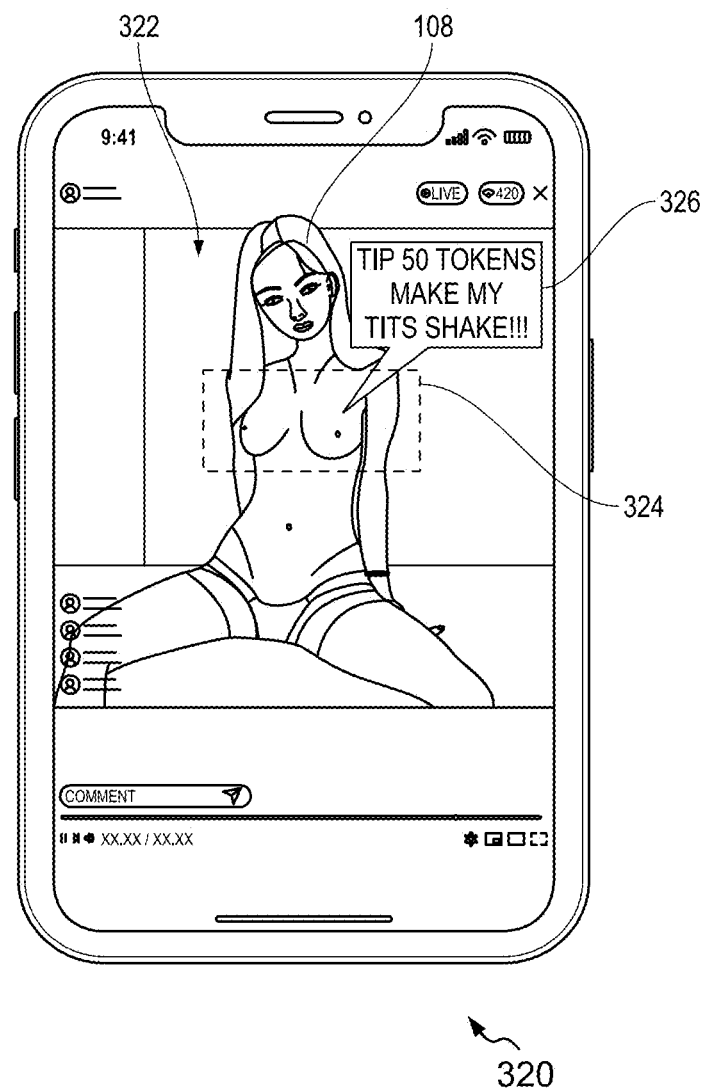
FIG. 3C illustrates an exemplary representation of a user interface (UI) depicting interaction between the viewer and the content creator using at least one interaction element configured with a second interaction mode, in accordance with an embodiment of the present disclosure.

FIG. 3C illustrates an exemplary representation of a user interface (UI) 320 depicting interaction between a viewer such as the viewer 102a and the content creator 108 using at least one interaction element configured with a second interaction mode, in accordance with an embodiment of the present disclosure. As shown, the UI 320 is depicted to include media content 322 being performed by the content creator 108 in the interactive platform 122. The media content 322 may be accessed by a viewer (for example, the viewer 102a) using the second user device 104a. In this scenario, the system 200 identifies a set of target objects 324. For example, the chest of the content creator 108 is identified as the set of target objects 324. The identification of the set of target objects 324 is exemplarily depicted using a dashed boundary. In this scenario, the system 200 may determine at least one interaction element 326 and define the interaction mode to be the second interaction mode. The at least one interaction element 326 configured with the second interaction mode may be a text prompt (as shown in FIG. 3C). In an embodiment, the text prompt (i.e., the at least one interaction element 326) may be configured with predefined display animations (e.g., a flipping animation). The text prompt guides the viewer 102a to provide tokens to the content creator 108 in the content 322. The viewer 102a may be provided with the token rendering tool (such as the at least one interaction element 306) upon clicking on the text prompt (i.e., the at least one interaction element 326). The text prompt is exemplarily depicted as 'PROVIDE 50 TOKENS TO MAKE MY TITS SHAKE!!!'. Thus, the viewer 102a may provide the mentioned tokens for enabling the content creator 108 to perform the specified action in the text prompt. In other words, once the viewer 102a provide 50 tokens to the content creator 108 as suggested in the at least one interaction element 326, the content creator 108 performs a live show of shaking the tits to the viewer 102a.

In an example scenario, the system 200 may identify a sexual organ (e.g., pussy) of the content creator 108 as the set of target objects in the media content 322. As a result, the media content 322 may be provided with the at least one interaction element (such as the text prompt including the text 'PROVIDE MORE TOKENS TO MAKE ME SQUIRT'. In this scenario, the viewer 102a is guided to provide more tokens to enable the content creator 108 to perform a live show of squirting in the media content 322.

In an embodiment, the at least one interaction element 326 configured with the second interaction mode is dynamically updated in the media content 322 corresponding to a position of the set of target objects 324 of the media content 322. In other words, a display position of the at least one interaction element 326 is dynamically updated following the position of the set of target objects 324 in the media content 322 at different time stamps. For example, the set of target objects 324 (e.g., pussy of the content creator 108) is located in the middle of the media content 322 in a previously rendered frame. In the next frame of the media content 322, the set of target objects 324 may be shifted to a lower portion in the media content 322. In this scenario, the at least one interaction element 326 dynamically shifts from the middle of the media content 322 in the previous frame to the lower portion of the media content 322 in the subsequent frame.

In another embodiment, the display position of the at least one interaction element 326 is predefined in the media content 322 irrespective of any change in the display position of the set of target objects 324 in the media content 322.

Figure 4:
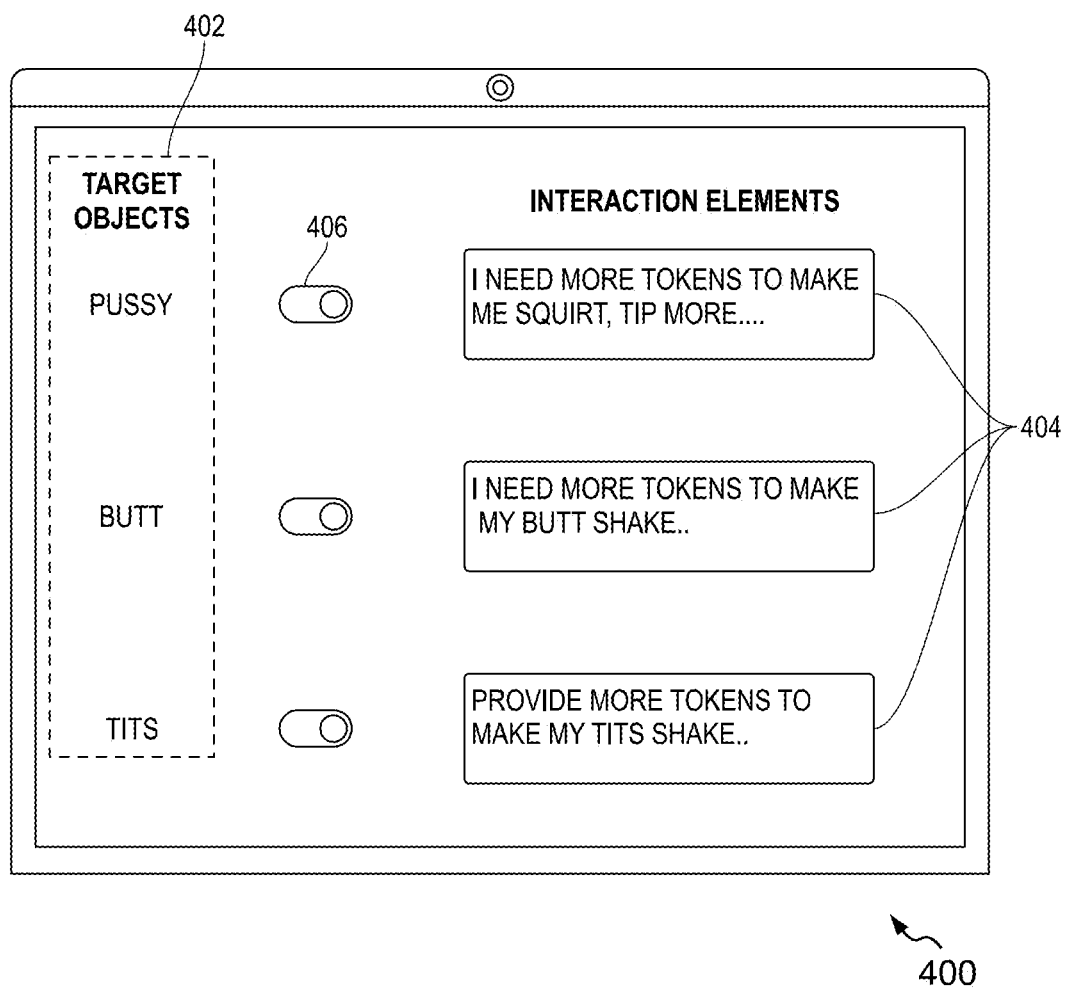
FIG. 4 illustrates an exemplary representation of a user interface (UI) rendered to the content creator for defining the at least one interaction element configured with the second interaction mode in an interactive platform, in accordance with an embodiment of the present disclosure.

FIG. 4 illustrates an exemplary representation of a user interface (UI) 400 rendered to the content creator 108 for defining the at least one interaction element configured with the second interaction mode in the interactive platform 122, in accordance with an embodiment of the present disclosure. As shown, the UI 400 is depicted to include a list of target objects 402 defined in the interactive platform 122. Each target object of the list of target objects 402 is associated with a data field 404 for obtaining user inputs from the content creator 108. Further, each target object of the list of target objects 402 is associated with a toggle switch 406 for selecting the target object to be identified in the media content being rendered on the interactive platform 122. Thus, the content creator 108 may provide inputs in the data field 404 and the toggle switch 406 associated with each target object of the list of target objects 402 for defining the at least one interaction element configured with the second interaction mode. Herein, the inputs of the content creator 108 in the data field 404 correspond to the at least one interaction element. For example, the inputs in the data field 404 associated with the target object 'Chest' includes 'PROVIDE MORE TOKENS TO MAKE MY TITS SHAKE'. The inputs in the data field 404 may be rendered as the at least one interaction element (such as the text prompt) in the media content of the content creator 108 based on detecting the chest of the content creator 108 as the set of target objects in the media content of the content creator 108.

Figure 5B:
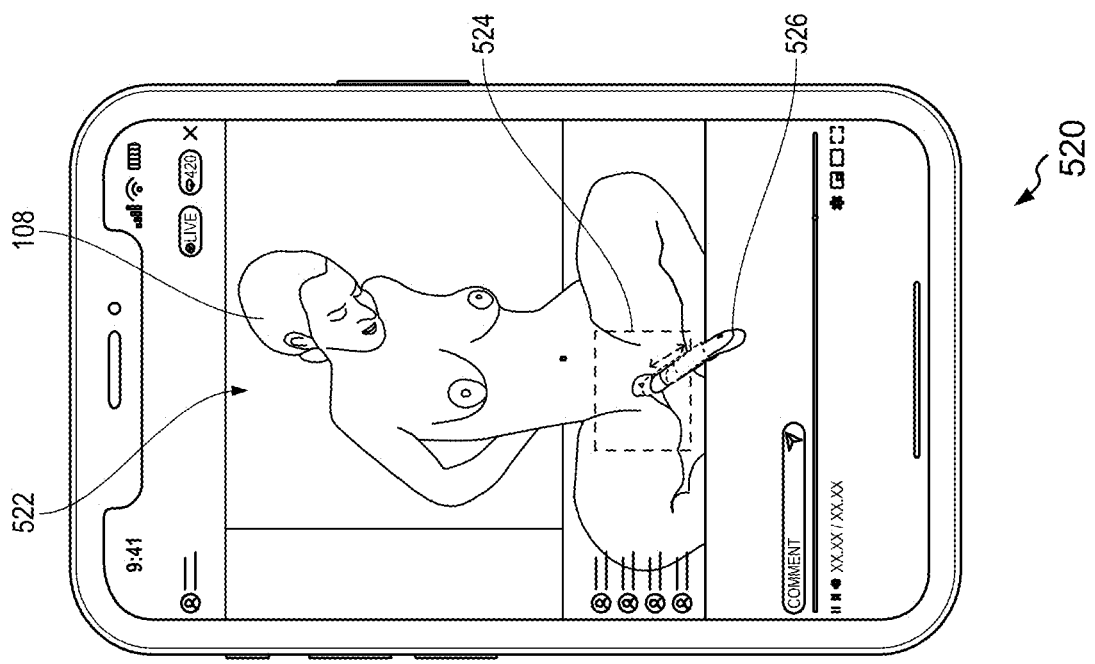
FIG. 5B illustrates an exemplary representation of a user interface (UI) depicting a visual effect being rendered in the media content on the interactive platform, in accordance with an embodiment of the present disclosure.
Figure 5A:
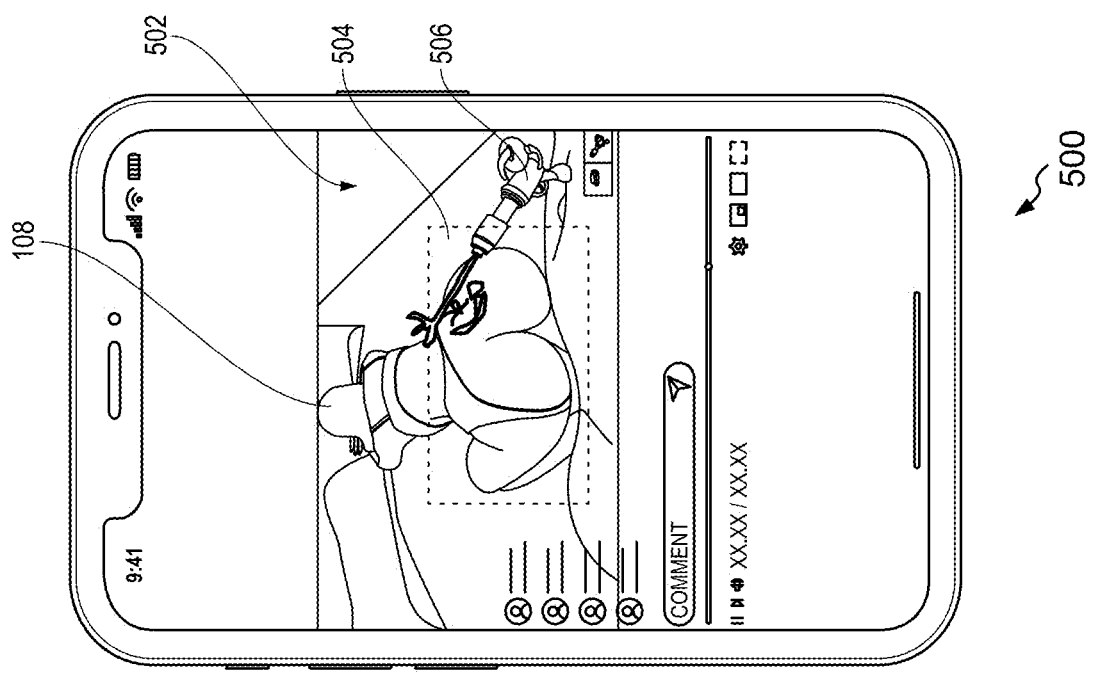
FIG. 5A illustrates an exemplary representation of a user interface (UI) depicting a visual effect being rendered in media content on the interactive platform, in accordance with an embodiment of the present disclosure.

FIG. 5A illustrates an exemplary representation of a user interface (UI) 500 depicting a visual effect being rendered in media content 502 on the interactive platform 122, in accordance with an embodiment of the present disclosure. As shown, the UI 500 depicts the media content 502 of the content creator 108 being rendered on the interactive platform 122. The UI 500 further depicts a set of target objects 504 identified in the media content 502. In this scenario, the buttocks of the content creator 108 is identified as the set of target objects 504. The identification of the set of target objects 504 is exemplarily depicted using a dashed boundary. Further, a viewer such as the viewer 102a may provide inputs to interact with the at least one interaction element configured in the first interaction mode or the second interaction mode as explained above. For description purposes, the at least one interaction element configured with the first interaction mode is considered as the at least one interaction element 306. The viewer 102a may provide the tokens by using the at least one interaction element 306. The system 200 renders a visual effect 506 on the set of target objects 504 based on determining the tokens being provided to the content creator 108 performing the media content 502. The visual effect 506 is exemplarily depicted as an animation of spraying milk to the buttocks (i.e., the set of target objects 504) in the media content 502. Herein, the set of actions being performed by the visual effect 506 includes spraying of milk to the buttocks.

FIG. 5B illustrates an exemplary representation of a user interface (UI) 520 depicting a visual effect being rendered in media content 522 on the interactive platform 122, in accordance with an embodiment of the present disclosure. As shown, the UI 520 depicts the media content 522 of the content creator 108 being rendered on the interactive platform 122. The UI 520 further depicts a set of target objects 524 identified in the media content 522. In this scenario, the vagina of the content creator 108 is identified as the set of target objects 524. The identification of the set of target objects 524 is exemplarily depicted using a dashed boundary. In this scenario, the system 200 may be configured to detect whether the sexual stimulation device 116 of the content creator 108 is communicably coupled to the first user device 110 (or the interactive platform 122) based on detecting the set of target objects 524. As explained above, the sexual stimulation device 116 is wirelessly connected to the first user device 110 which enables the interactive platform 122 to control the sexual stimulation device 116. In one scenario, if the sexual stimulation device 116 is determined to be communicably coupled to the interactive platform 122 (or the first user device 110), the system 200 renders a visual effect 526 corresponding to the sexual stimulation device 116 and the operating mode of the sexual stimulation device 116. The visual effect 526 may be configured to perform a set of actions on the set of target objects 524. In this scenario, the set of actions is defined based on the operating mode of the sexual stimulation device 116. For example, the operating mode of the sexual stimulation device 116 may include vibration, rotation, heating, spraying liquid, glowing, and the like. In one example scenario, the operating mode of the sexual stimulation device 116 may be vibration. In this example scenario, the visual effect 526 may be rendered as an animation of the sexual stimulation device 116 vibrating in the vagina (as shown in FIG. 5B).

Figure 6A:
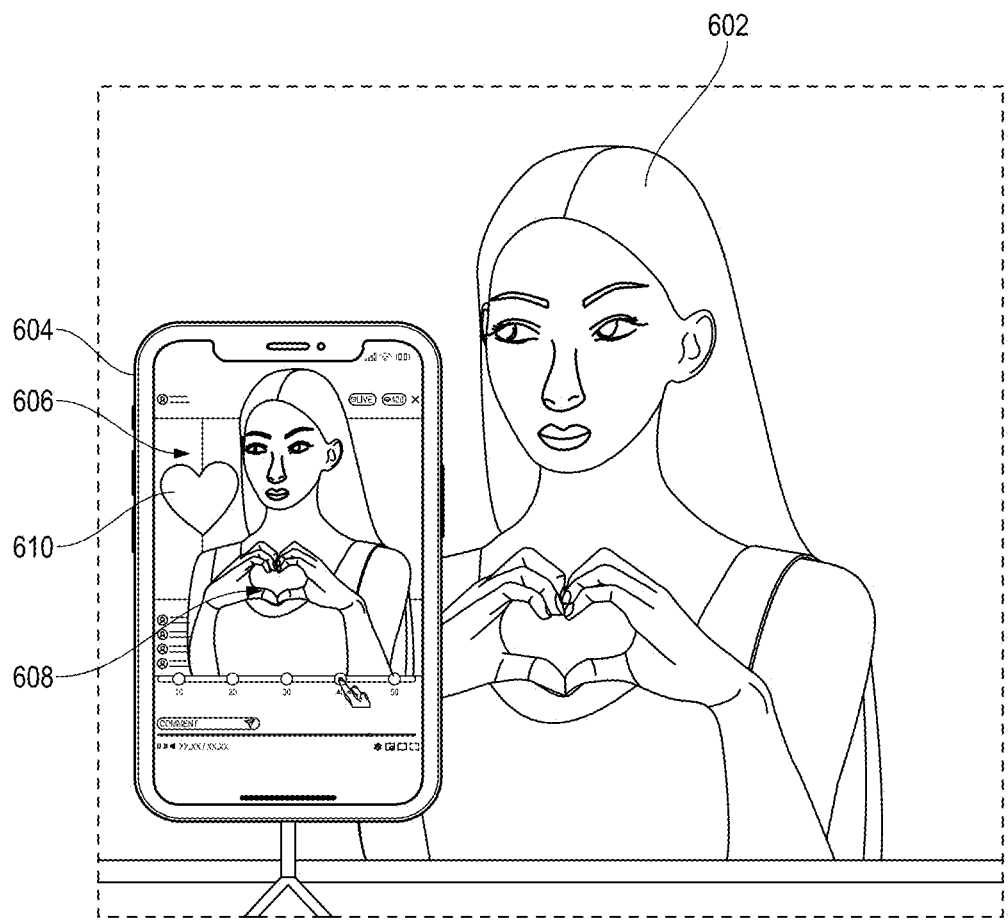
FIGS. 6A and 6B illustrate an example scenario depicting the rendering of a plurality of visual elements based on gestures performed by the content creator in the media content, in accordance with an embodiment of the present disclosure.

FIG. 6A illustrates an example scenario depicting the rendering of a plurality of visual elements based on gestures performed by a content creator in media content 606, in accordance with an embodiment of the present disclosure. As shown, a content creator 602 uses a first user device 604 to capture the media content 606 to be rendered on the interactive platform 122. The content creator 602 is an example of the content creator 108. The content creator 602 performs gestures 608 (e.g., a gesture of a love heart with a finger). The system 200 may implement the one or more ML models 226 to detect the gestures 608 being performed by the content creator 602. Further, the system 200 identifies the gestures 608 being performed in the media content 606 and renders a plurality of visual elements 610. The plurality of visual elements 610 is exemplarily depicted to be an animation of a dynamic heart shape in the media content 606 being rendered on the interactive platform 122. The media content 606 rendering the plurality of visual elements 610 is accessed by the plurality of viewers 102 on their respective second user devices 104a-104c.

Figure 6B:
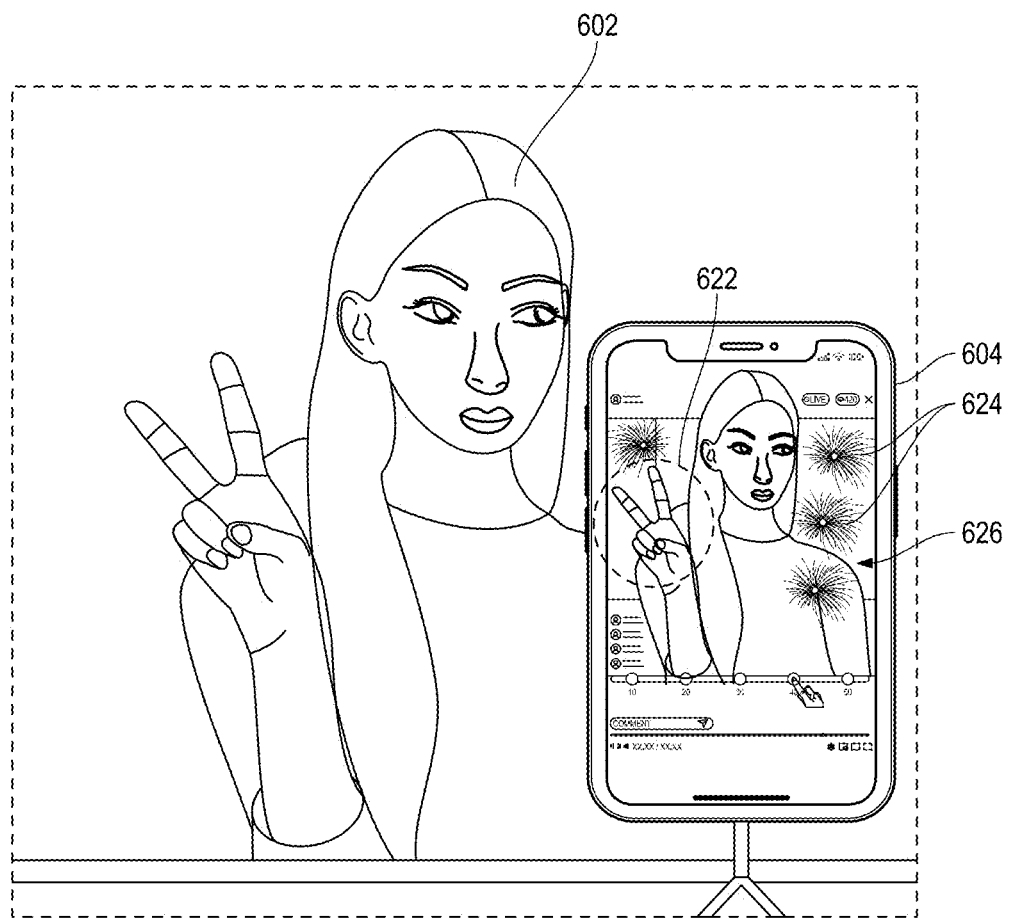

In an embodiment, the content creator 602 may perform gestures 622 such as a victory gesture (as shown in FIG. 6B) in media content 626. The system 200 may implement the one or more ML models 226 to detect the gestures 622 being performed by the content creator 602 in the media content 626. In this scenario, the system 200 identifies the gestures 622 being performed in the media content 626 and renders a plurality of visual elements 624 (as shown in FIG. 6B). The plurality of visual elements 624 is exemplarily depicted to be an animation of a firework in the media content 626 being rendered on the interactive platform 122. The media content 626 rendering the plurality of visual elements 624 is accessed by the plurality of viewers 102 on their respective second user devices 104a-104c as explained above.

In one example scenario, the content creator 602 may perform different gestures such as a calm gesture by joining hands together. In this scenario, the system 200 may render a soft light kinetic effect as the plurality of visual elements. In another example scenario, the content creator 602 may perform an energetic gesture (e.g., clenched fist raised). In this scenario, a strong energy fluctuation kinetic effect may be rendered as the plurality of visual elements.

The gestures 608/622 performed by the content creator 602 may be used to interact with the plurality of viewers 102 (such as guiding the viewers 102 to like the content creator 602, guiding the viewers 102 to provide tokens, etc.) viewing the media content 626/606 of the content creator 602. For example, when the content creator 602 makes a specific pointing gesture, an animated cue may be rendered as a plurality of visual elements (not shown in figures) on the media content (e.g., the media content 626/606). The plurality of visual elements may include a flashing thumbs-up icon departing from the finger of the content creator 602. In this scenario, the system 200 may render at least one interaction element configured with the first interaction mode such as a like button in the media content 606/626, thus allowing the plurality of viewers 102 to provide a like to the content creator 602. Additionally, or alternatively, the system 200 may render the at least one interaction element configured with the second interaction mode (e.g., a voice prompt) to the plurality of viewers 102 viewing the media content 606/626, thus allowing the plurality of viewers 102 to provide a like to the content creator 602.

Furthermore, the system 200 may be configured to analyze behavioural patterns of the plurality of viewers 102 viewing the media content 606/626 based on the interaction input being provided by the plurality of viewers 102 to like the content creator 602. For example, the viewer 102b may not provide the interaction input to like the content creator 602 upon providing the voice prompt to the viewer 102b. In this scenario, the system 200 may generate personalized notifications to the viewer 102b when the content creator 602 makes a specific gesture that leads to a like. In addition, the system 200 may generate avatars (see, 612 of FIG. 6A) of the viewers (e.g., the viewers 102a and 102c) who have provided the interaction input to like the content creator 602 in the media content 606. This creates a social atmosphere and prompts more viewers to participate in liking the content creator 602 in the media content 606. Similarly, the avatars of the viewers who provide like to the content creator 602 may be generated in the media content 626.

Figure 6C:
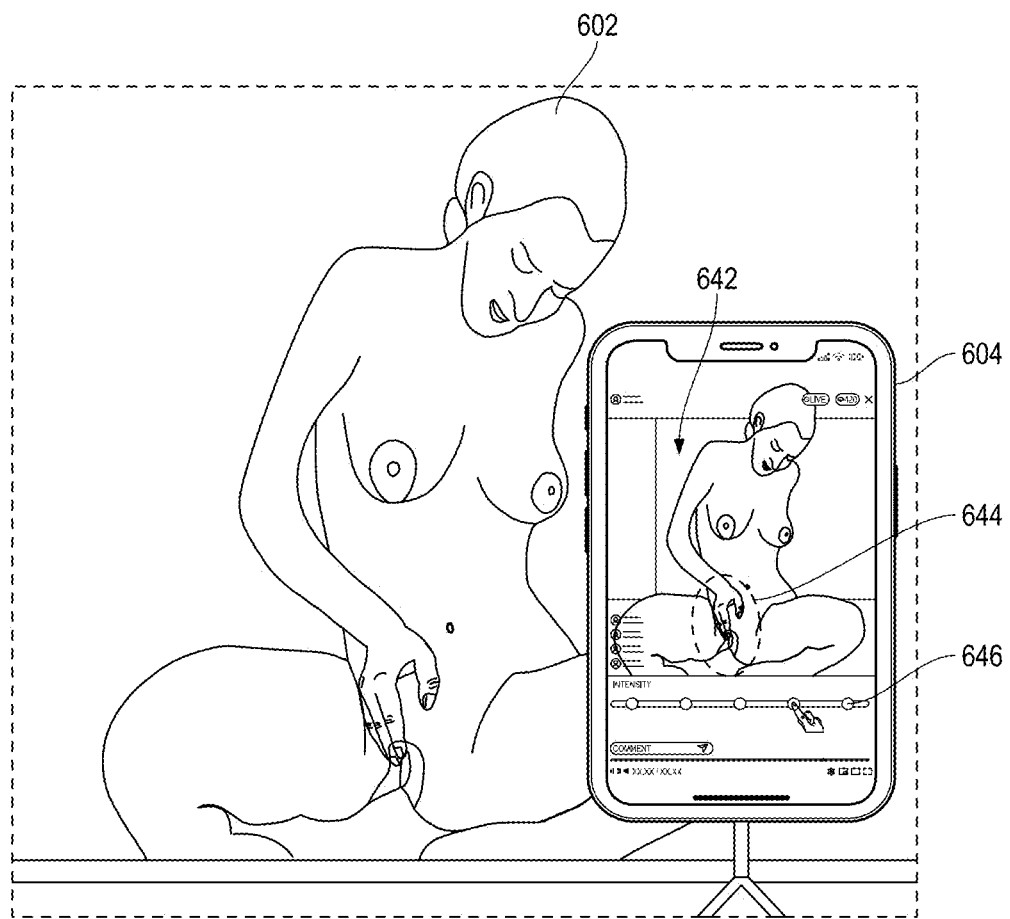
FIG. 6C illustrates an example scenario depicting the rendering of the at least one interaction element based on the gestures of the content creator in the media content, in accordance with an embodiment of the present disclosure.
Figure 6D:
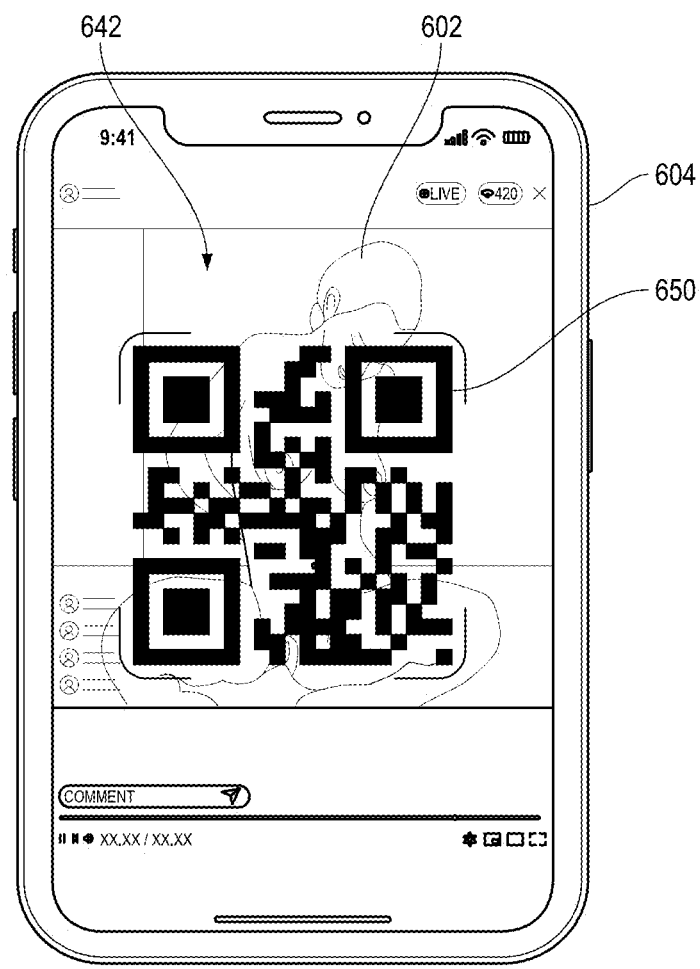
FIG. 6D illustrates an example scenario depicting the rendering of a unique code based on the gestures of the content creator in the media content, in accordance with an embodiment of the present disclosure.

FIG. 6C illustrates an example scenario depicting the rendering of the at least one interaction element based on the gestures of the content creator 602 in media content 642, in accordance with an embodiment of the present disclosure. As shown, the content creator 602 performs a gesture 644 in the media content 642 being rendered on the interactive platform 122. The gesture 644 is exemplarily depicted to be a performing masturbation action in the media content 642. The gesture 644 is identified as the set of target objects. In this scenario, the system 200 may render at least one interaction element 646 configured with the first interaction mode corresponding to the gesture 644. The at least one interaction element 646 may be an interaction control interface to adjust the parameters such as the vibration intensity of a sex toy. The plurality of viewers 102 may provide the interaction input using the at least one interaction element 646 to adjust the vibration intensity. In response to the interaction input, the content creator 602 may perform a live performance (e.g., sexual performance) based on the extent of the vibration intensity being adjusted using the at least one interaction element 646.

In an embodiment, the system 200 may render a unique code (see, 650 of FIG. 6D) in response to identifying the gesture 644 in the media content 642 being performed by the content creator 602. In this scenario, the plurality of viewers 102 may be required to scan the unique code 650 to access the at least one interaction element (such as the at least one interaction element 646). Thereafter, the plurality of viewers 102 may provide the interaction input using the at least one interaction element 646 to adjust the vibration intensity as explained above.

Figure 6E:
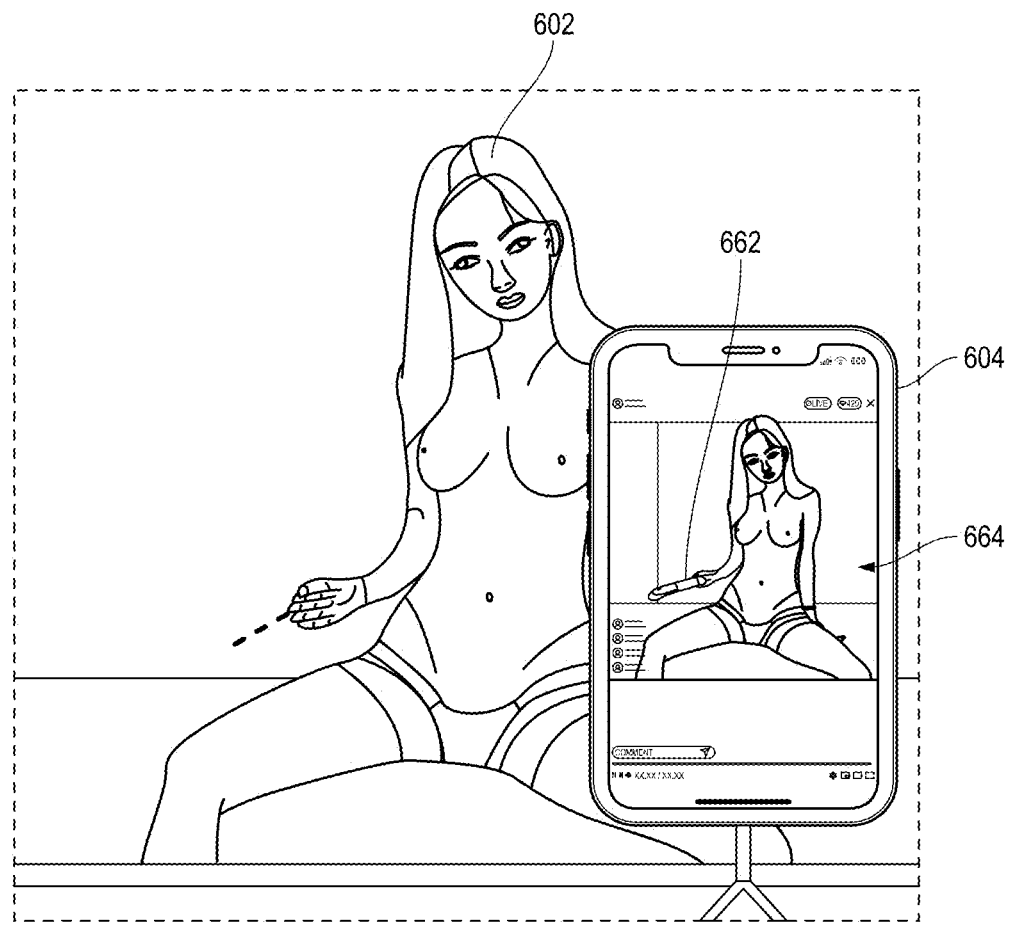
FIG. 6E illustrates an example scenario depicting rendering of the at least one interaction element based on a selection input on an adult toy in the media content, in accordance with an embodiment of the present disclosure.

Referring to FIG. 6E, the content creator 602 may perform a selection gesture for selecting an adult toy 662 being rendered in media content 664. The selection gesture of the content creator 602 is exemplarily represented as a selection tool in the media content 664. The selection gesture on the adult toy 662 is identified as the set of target objects. In this scenario, the system 200 may render a text prompt (exemplarily depicted to include 'CONTROL THE ADULT TOY') corresponding to the selection of the adult toy 662. In this scenario, the plurality of viewers 102 may click (i.e., the interaction input) the text prompt to access the at least one interaction (such as the at least one interaction element 646). Thereafter, the plurality of viewers 102 may provide the interaction input using the at least one interaction element 646 to adjust the vibration intensity of the adult toy 662 in the media content 664.

Figure 7:
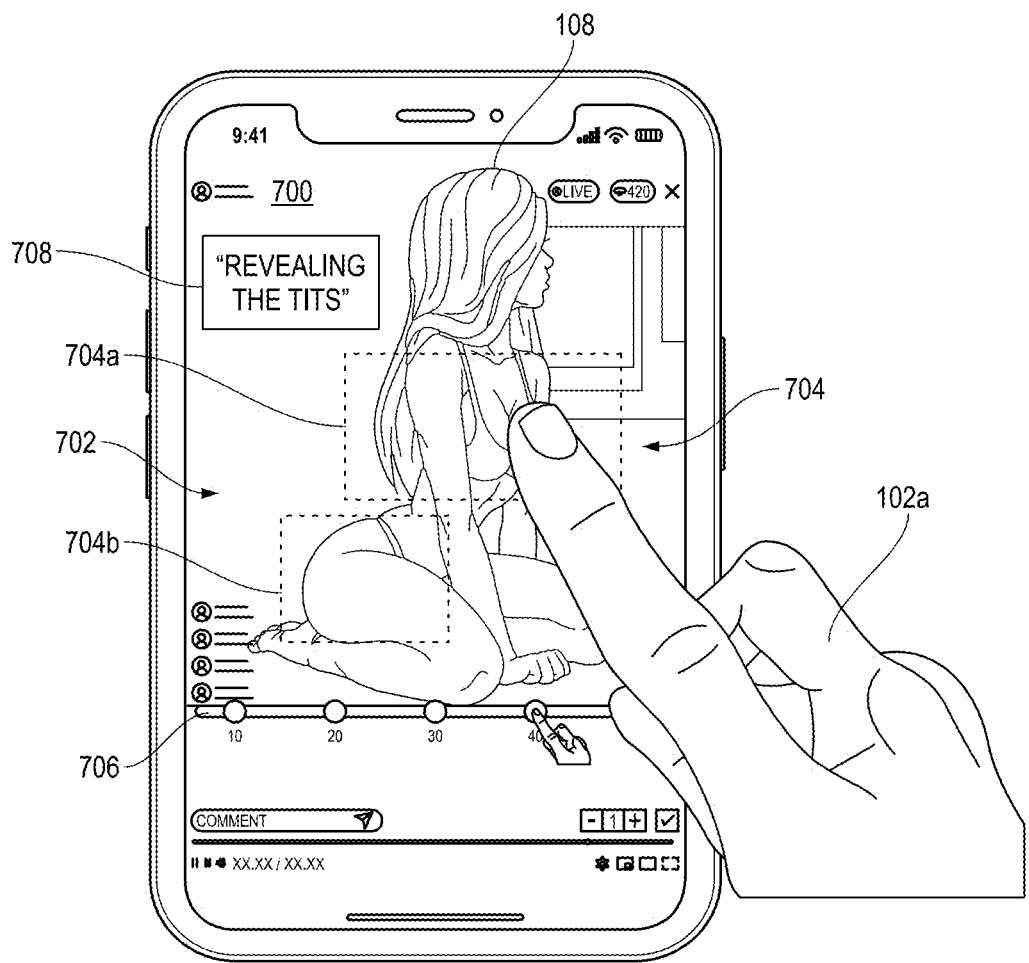
FIG. 7 illustrates an exemplary representation of a user interface (UI) rendered to the viewer for providing inputs on a set of target objects in the media content, in accordance with an embodiment of the present disclosure.

FIG. 7 illustrates an exemplary representation of a user interface (UI) 700 rendered to a viewer such as the viewer 102a for providing inputs on a set of target objects in media content 702, in accordance with an embodiment of the present disclosure. As shown, the UI 700 is depicted to include the media content 702 of the content creator 108 being performed on the interactive platform 122. The media content 702 may be accessed by a viewer such as the viewer 102a. In this scenario, the system 200 may identify a set of target objects 704. The set of target objects 704 may include a target object 704a (e.g., chest) and a target object 704b (e.g., buttocks) of the content creator 108. Further, the system 200 may detect positional coordinates of the target object 704a of the set of target objects 704 identified in the media content 702 of the content creator 108 based on applying object detection techniques as explained above. Furthermore, the system 200 detects an interaction position parameter of an interaction input provided by at least one viewer (such as the viewer 102a) of the plurality of viewers 102. The viewer 102a may provide the interaction input on an interaction interface of the second user device 104a while viewing the media content 702 of the content creator 108 on the interactive platform 122 equipped in the second user device 104a of the at least one viewer 102. The interaction input may be clicking the target object 704a on the interaction interface of the second user device 104a to interact with the target object 704a. In this scenario, the system 200 may compare the interaction position parameter and the positional coordinates of the target object 704a to determine whether the interaction position parameter of the interaction input provided matches with the positional coordinates.

Thereafter, the system 200 may generate an operation instruction 706 in response to determining the successful matching of the interaction position parameter of the interaction input with the positional coordinates of the target object 704a. The operation instruction 706 corresponds to the at least one interaction element. The operation instruction 706 is configured to facilitate the interaction between the at least one viewer 102a and the content creator 108 corresponding to the interaction input. The operation instruction 706 may include one of operating a token rendering tool (as shown in FIG. 7). Furthermore, the system 200 determines an operation result corresponding to the execution of the operation instruction 706 in the media content 702. For example, a viewer (such as the viewer 102a) may execute the operation instruction such as operating the token rendering tool (i.e., the operation instruction 706) to render the tokens in the media content 702. In this scenario, system 200 records the operation result i.e., the tokens rendered using the token rendering tool. Thereafter, the system 200 determines at least one of a segment in the media content 702 corresponding to the operation result obtained based on the execution of the operation instruction 706 in the media content 702, and an object type of the set of target objects 704. For example, the segment of the media content 702 shows the revealing of the chest of the content creator 108. Accordingly, the system 200 renders a plurality of visual elements 708 that match the content (such as the revealing of the chest) of the segment identified in the media content 702. For illustration purposes, the plurality of visual elements 708 is exemplarily depicted to be a text such as 'REVEALING THE TITS' to match the context of the identified segment. In addition, the system 200 may render an animation effect along with the text as the plurality of visual elements 708.

Figure 8:
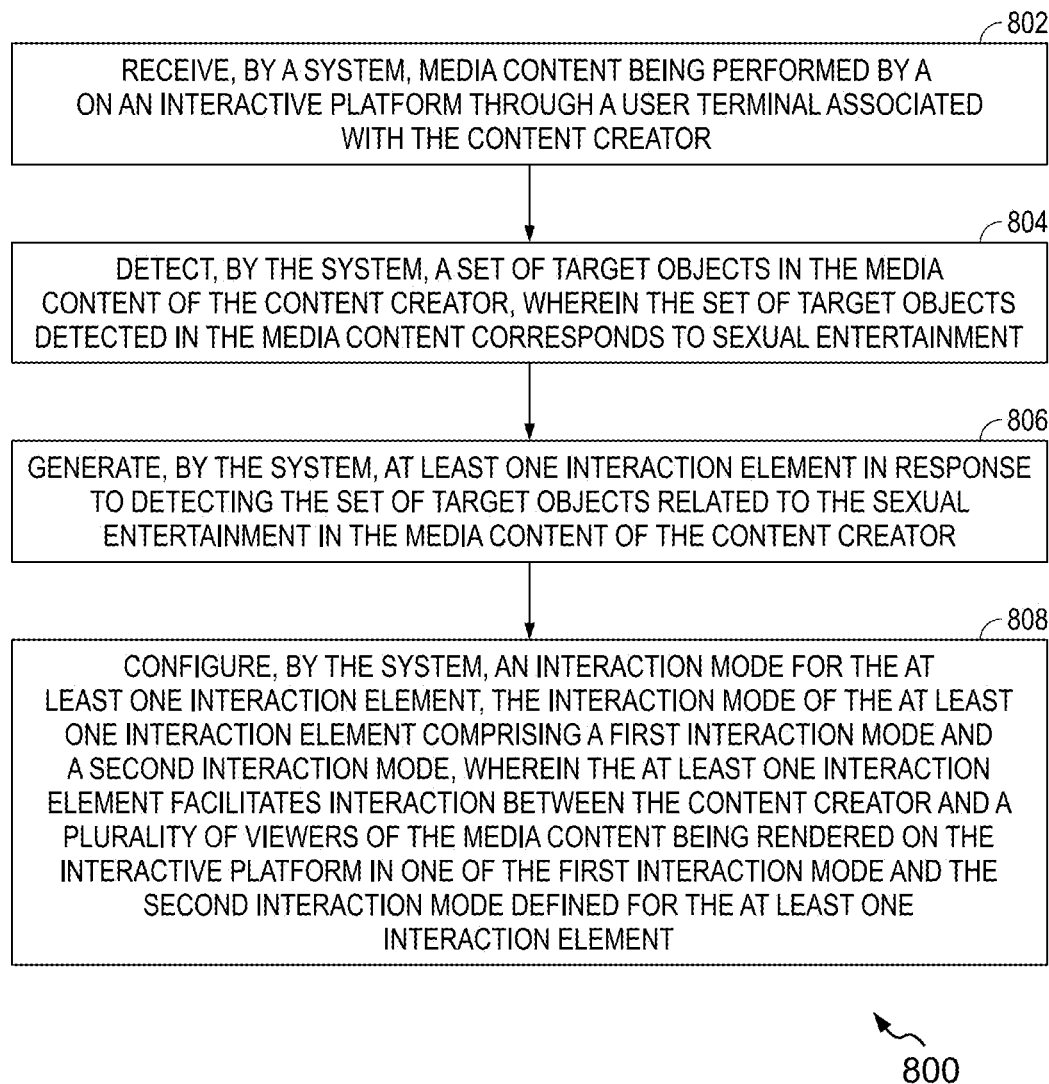
FIG. 8 illustrates a flow diagram of a computer-implemented method for providing the interactive platform to facilitate interaction between the content creator and a plurality of viewers, in accordance with an embodiment of the present disclosure.

FIG. 8 illustrates a flow diagram of a computer-implemented method 800 for providing the interactive platform 122 to facilitate interaction between the content creator 108 and the viewers 102, in accordance with an embodiment of the present disclosure. The method 800 depicted in the flow diagram may be executed by, for example, the system 200 or the system 120. Operations of the flow diagram of the method 800, and combinations of the operations in the flow diagram of the method 800, may be implemented by, for example, hardware, firmware, a processor, circuitry, and/or a different device associated with the execution of software that includes one or more computer program instructions. It is noted that the operations of the method 800 can be described and/or practiced by using a system other than the system 200. The method 800 starts at operation 802.

At operation 802, the method 800 includes obtaining, by the system 200, media content being performed by the content creator 108 on the interactive platform 122 through the first user device 110 associated with the content creator 108.

At operation 804, the method 800 includes detecting, by the system 200, a set of target objects in the media content of the content creator 108. The set of target objects detected in the media content corresponds to online adult entertainment.

At operation 806, the method 800 includes generating, by the system 200, at least one interaction element in response to detecting the set of target objects related to the online adult entertainment in the media content of the content creator 108.

At operation 808, the method 800 includes configuring, by the system 200, an interaction mode for the at least one interaction element. The interaction mode of the at least one interaction element includes a first interaction mode and a second interaction mode. The at least one interaction element facilitates interaction between the content creator 108 and the plurality of viewers 102 of the media content being rendered on the interactive platform 122 in one of the first interaction mode and the second interaction mode defined for the at least one interaction element. Further, the one or more operations for providing the interactive platform are already explained with reference to FIGS. 1-7, therefore they are not reiterated herein for the sake of brevity.

Figure 9:
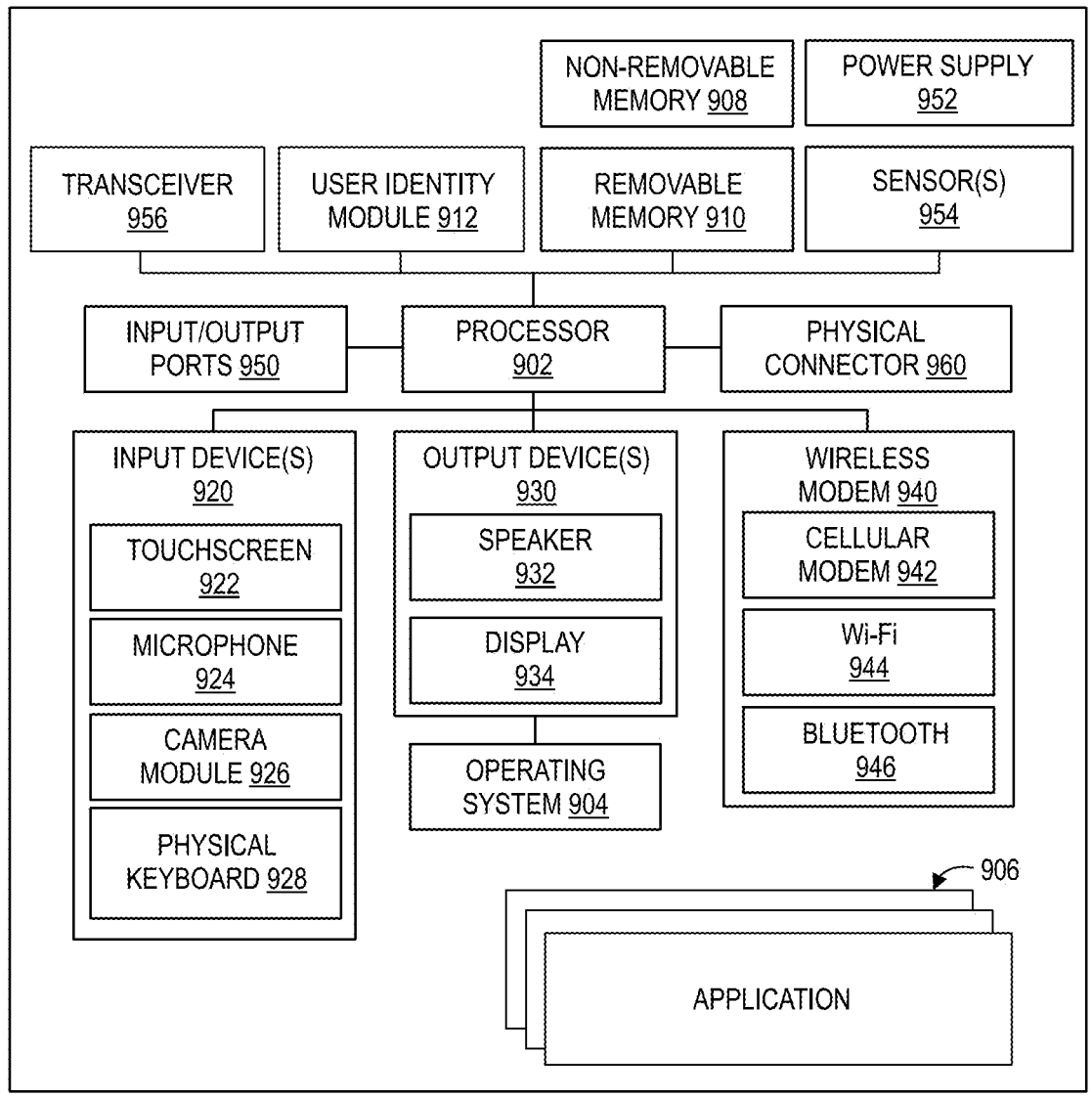
FIG. 9 is a simplified block diagram of an electronic device capable of implementing various embodiments of the present disclosure.

FIG. 9 is a simplified block diagram of an electronic device 900 capable of implementing various embodiments of the present disclosure. For example, the electronic device 900 may correspond to the second user devices 104a-104c, and the first user device 110 of FIG. 1. The electronic device 900 is depicted to include one or more applications 906. For example, the one or more applications 906 may include the interactive platform 122 of FIG. 1. The one or more applications 906 installed on the electronic device 900 is capable of communicating with a server (i.e., the system 200 or the system 120) to render an interactive platform.

It should be understood that the electronic device 900 as illustrated and hereinafter described is merely illustrative of one type of device and should not be taken to limit the scope of the embodiments. As such, it should be appreciated that at least some of the components described below in connection with the electronic device 900 may be optional and thus in an embodiment may include more, less, or different components than those described in connection with the embodiment of the FIG. 9. As such, among other examples, the electronic device 900 could be any mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 controls the allocation and usage of the components of the electronic device 900 and supports one or more operations of the application (see, the applications 906) that implements one or more of the innovative features described herein. In addition, the applications 906 may include common mobile computing applications (e.g., telephony applications, email applications, calendars, contact managers, web browsers, messaging applications) or any other computing application.

The illustrated electronic device 900 includes one or more memory components, for example, a non-removable memory 908 and/or removable memory 910. The non-removable memory 908 and/or the removable memory 910 may be collectively known as a database in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904 and the applications 906. The electronic device 900 may further include a user identity module (UIM) 912. The UIM 912 may be a memory device having a processor built in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in the form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 900 can support one or more input devices 920 and one or more output devices 930. Examples of the input devices 920 may include, but are not limited to, a touch screen/a display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to, a speaker 932 and a display 934. Other possible output devices can include piezoelectric or other haptic output devices. Some devices can serve more than one input/output function. For example, the touch screen 922 and the display 934 can be combined into a single input/output device.

A wireless modem 940 can be coupled to one or more antennas (not shown in FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device, or a local wireless data network or router, and/or a Bluetooth-compatible modem 946. The wireless modem 940 is typically configured for communication with one or more cellular networks, such as a GSM network for data and voice communications within a single cellular network, between cellular networks, or between the electronic device 900 and a public switched telephone network (PSTN).

The electronic device 900 can further include one or more input/output ports 950, a power supply 952, one or more sensors 954 for example, an accelerometer, a gyroscope, a compass, or an infrared proximity sensor for detecting the orientation or motion of the electronic device 900 and biometric sensors for scanning biometric identity of an authorized user, a transceiver 956 (for wirelessly transmitting analog or digital signals) and/or a physical connector 960, which can be a USB port, IEEE 1294 (FireWire) port, and/or RS-232 port. The illustrated components are not required or all-inclusive, as any of the components shown can be deleted and other components can be added.

The disclosed method with reference to FIG. 8, or one or more operations of the system 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or Digital Signal Processor (DSP) circuitry).

Particularly, the system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based on these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
    obtaining, by a system, media content being performed by a content creator on an interactive platform through a first user device associated with the content creator, wherein the media content is configured for transmission to at least one second user device of at least one viewer communicatively connected to the first user device for presentation;
    detecting, by the system, a set of target objects in the media content of the content creator, wherein the set of target objects detected in the media content corresponds to online adult entertainment;
    generating, by the system, at least one interaction element in response to detecting the set of target objects corresponding to the online adult entertainment in the media content of the content creator; and
    executing, by the system, an interaction mode for the at least one interaction element, wherein the interaction mode of the at least one interaction element includes one or both of a first interaction mode and a second interaction mode, wherein the first interaction mode is configured to provide an interface for interactive input corresponding to the set of target objects between the at least one second user device and the first user device, and the second interaction mode is configured to provide guidance on interactive input corresponding to the set of target objects between the at least one second user device and the first user device.

2. The computer-implemented method as claimed in claim 1, further comprising:
    analyzing, by the system, an identification weight associated with each target object of the set of target objects;
    selecting, by the system, a target object from the set of target objects based on determining the identification weight associated with the target object of the set of target objects being greater than the identification weight of another target object of the set of target objects; and
    generating, by the system, the at least one interaction element corresponding to the target object selected among the set of target objects.

3. The computer-implemented method as claimed in claim 1, further comprising:
    determining, by the system, whether a sexual stimulation device associated with the content creator is communicably coupled to the interactive platform equipped on the first user device of the content creator, wherein the communicable coupling between the sexual stimulation device associated with the content creator and the interactive platform is determined in response to detecting the set of target objects corresponding to the online adult entertainment in the media content of the content creator;
    in response to determining the sexual stimulation device of the content creator is communicably coupled to the interactive platform equipped on the first user device, determining, by the system, a visual effect based on the sexual stimulation device and an operating mode of the sexual stimulation device; and
    rendering, by the system, the visual effect in the media content of the content creator, the visual effect configured to perform a set of actions on the set of target objects, wherein the set of actions is defined based on the operating mode of the sexual stimulation device.

4. The computer-implemented method as claimed in claim 3, further comprising:
    monitoring, by the system, tokens being rendered by a viewer among the at least one viewer to the content creator and a selection input of the viewer on the visual effect rendered in the media content on the interactive platform;
    generating, by the system, a control instruction based on the selection input on the visual effect and the tokens rendered by the viewer to the content creator in the interactive platform; and
    transmitting, by the system, the control instruction to the first user device of the content creator, the control instruction configured to operate at least the sexual stimulation device of the content creator and request the content creator to perform a sexual activity.

5. The computer-implemented method as claimed in claim 1, further comprising:
    obtaining an interaction input generated between the at least one second user device and the first user device; and
    generating, in response to the interaction input, a corresponding operation instruction, the operation instruction being configured to control the at least one second user device or the first user device to perform a sexual entertainment action corresponding to the interaction input.

6. The computer-implemented method as claimed in claim 1, further comprising:
    detecting, by the system, positional coordinates of a target object of the set of target objects identified in the media content of the content creator;
    detecting, by the system, an interaction position parameter of an interaction input provided by a viewer among the at least one viewer on an interaction interface of the second user device of the viewer while viewing the media content of the content creator on the interactive platform equipped in the second user device of the viewer, wherein the viewer provides the interaction input on the target object to facilitate interaction between the at least one viewer and the content creator;

determining, by the system, whether the interaction position parameter of the interaction input provided by the viewer matches with the positional coordinates of the target object rendered in the media content of the content creator; and generating, by the system, an operation instruction in response to determining a successful matching of the interaction position parameter of the interaction input with the positional coordinates of the target object rendered in the media content, wherein the operation instruction corresponds to the at least one interaction element, the operation instruction configured to facilitate the interaction between the viewer and the content creator corresponding to the interaction input.

7. The computer-implemented method as claimed in claim 6, wherein the operation instruction comprises at least one of operating a token rendering tool, generating a control instruction to control a sexual stimulation device of the content creator, and a set of interaction options.

8. The computer-implemented method as claimed in claim 6, further comprising:

determining, by the system, an operation result corresponding to execution of the operation instruction in the media content of the content creator;

determining, by the system, at least one of a segment in the media content corresponding to the operation result obtained based on the execution of the operation instruction in the media content, and an object type of the set of target objects; and rendering, by the system, a plurality of visual elements in the segment of the media content determined corresponding to the operation result.

9. The computer-implemented method as claimed in claim 6, further comprising:

rendering, by the system, a plurality of visual elements in the media content of the content creator based on identifying gestures performed by the content creator in the media content, wherein the gestures correspond to the set of target objects.

10. The computer-implemented method as claimed in claim 1, wherein the at least one interaction element is predefined for the media content being rendered on the interactive platform based on user inputs provided by the content creator in the interactive platform.

11. The computer-implemented method as claimed in claim 1, wherein the set of target objects comprises one or more of body parts, body morphology, gestures, a sexual stimulation device, or scene information of the media content.

12. The computer-implemented method as claimed in claim 1, wherein the at least one interaction element configured with the first interaction mode comprises an interface interaction control being rendered on the interactive platform.

13. The computer-implemented method as claimed in claim 1, wherein the at least one interaction element configured with the second interaction mode comprises one or more of a voice prompt, a text prompt, image data, or a visual effect configured to guide at least the content creator and the at least one viewer to provide an interaction input.

14. A system, comprising:
a communication interface;
a memory storing executable instructions; and
a processor operatively coupled with the communication interface and the memory, the processor configured to execute the executable instructions to cause the system to at least:

obtain media content being performed by a content creator on an interactive platform through a first user device associated with the content creator, wherein the media content is configured for transmission to at least one second user device of at least one viewer communicatively connected to the first user device for presentation;

detect a set of target objects in the media content of the content creator, wherein the set of target objects detected in the media content corresponds to online adult entertainment;

generate at least one interaction element in response to detecting the set of target objects corresponding to the online adult entertainment in the media content of the content creator; and execute an interaction mode for the at least one interaction element, wherein the interaction mode of the at least one interaction element includes one or both of a first interaction mode and a second interaction mode, wherein the first interaction mode is configured to provide an interface for interactive input corresponding to the set of target objects between the at least one second user device and the first user device, and the second interaction mode is configured to provide guidance on interactive input corresponding to the set of target objects between the at least one second user device and the first user device.

15. The system as claimed in claim 14, wherein the system is further caused at least in part to:

analyze an identification weight associated with each target object of the set of target objects;

select a target object from the set of target objects based on determining the identification weight associated with the target object of the set of target objects being greater than the identification weight of another target object of the set of target objects; and generate the at least one interaction element corresponding to the target object selected among the set of target objects.

16. The system as claimed in claim 14, wherein the system is further caused at least in part to:

obtain an interaction input generated between the at least one second user device and the first user device;

generate, in response to the interaction input, a corresponding operation instruction, the operation instruction being configured to control the at least one second user device or the first user device to perform a sexual entertainment action corresponding to the interaction input.

17. The system as claimed in claim 14, wherein the at least one interaction element is predefined for the media content being rendered on the interactive platform based on user inputs provided by the content creator in the interactive platform.

18. The system as claimed in claim 14, wherein the set of target objects comprises one or more of body parts, body morphology, gestures, a sexual stimulation device, or scene information of the media content.

19. The system as claimed in claim 14, wherein the at least one interaction element configured with the first interaction mode comprises an interface interaction control being rendered on the interactive platform, and wherein the at least one interaction element configured with the second interaction mode comprises one or more of a voice prompt, a text prompt, image data, or a visual effect configured to guide at least the content creator and the at least one viewer to provide an interaction input.

20. A non-transitory computer-readable storage medium, comprising machine-readable instructions, the machine-readable instructions when executed by a processor of a system enabling the system to perform a method comprising:

obtaining media content being performed by a content creator on an interactive platform through a first user device associated with the content creator, wherein the media content is configured for transmission to at least one second user device of at least one viewer communicatively connected to the first user device for presentation;

detecting a set of target objects in the media content of the content creator, wherein the set of target objects detected in the media content corresponds to online adult entertainment;

generating at least one interaction element in response to detecting the set of target objects corresponding to the online adult entertainment in the media content of the content creator; and executing an interaction mode for the at least one interaction element, wherein the interaction mode of the at least one interaction element includes one or both of a first interaction mode and a second interaction mode, wherein the first interaction mode is configured to provide an interface for interactive input corresponding to the set of target objects between the at least one second user device and the first user device, and the second interaction mode is configured to provide guidance on interactive input corresponding to the set of target objects between the at least one second user device and the first user device.

* * * * *